US011153184B2

(12) United States Patent
Yadav et al.

(10) Patent No.: US 11,153,184 B2
(45) Date of Patent: Oct. 19, 2021

(54) TECHNOLOGIES FOR ANNOTATING PROCESS AND USER INFORMATION FOR NETWORK FLOWS

(71) Applicant: Cisco Technology, Inc., San Jose, CA (US)

(72) Inventors: Navindra Yadav, Cupertino, CA (US); Abhishek Ranjan Singh, Pleasanton, CA (US); Anubhav Gupta, Fremont, CA (US); Shashidhar Gandham, Fremont, CA (US); Jackson Ngoc Ki Pang, Sunnyvale, CA (US); Shih-Chun Chang, San Jose, CA (US); Hai Trong Vu, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 85 days.

(21) Appl. No.: 16/237,187

(22) Filed: Dec. 31, 2018

(65) Prior Publication Data

US 2019/0215253 A1 Jul. 11, 2019

Related U.S. Application Data

(63) Continuation of application No. 15/152,163, filed on May 11, 2016, now Pat. No. 10,171,319.

(Continued)

(51) Int. Cl.
*G06F 9/455* (2018.01)
*H04L 12/26* (2006.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC .................................................. G06F 9/45558
See application file for complete search history.

(56) References Cited

U.S. PATENT DOCUMENTS 5,086,385 A 2/1992 Launey et al.
5,319,754 A 6/1994 Meinecke et al.
(Continued)

FOREIGN PATENT DOCUMENTS

CN 101093452 12/2007
CN 101770551 7/2010
(Continued)

OTHER PUBLICATIONS

Virtualization, Bosch, Apr. 2010, Lehigh University, pp. 1-33.
(Continued)

*Primary Examiner* — Charlie Sun
(74) *Attorney, Agent, or Firm* — Polsinelli

(57) ABSTRACT

Systems, methods, and computer-readable media for annotating process and user information for network flows. In some embodiments, a capturing agent, executing on a first device in a network, can monitor a network flow associated with the first device. The first device can be, for example, a virtual machine, a hypervisor, a server, or a network device. Next, the capturing agent can generate a control flow based on the network flow. The control flow may include metadata that describes the network flow. The capturing agent can then determine which process executing on the first device is associated with the network flow and label the control flow with this information. Finally, the capturing agent can transmit the labeled control flow to a second device, such as a collector, in the network.

24 Claims, 19 Drawing Sheets

Related U.S. Application Data

(60) Provisional application No. 62/171,899, filed on Jun. 5, 2015.

(51) Int. Cl.

| | |
|---|---|
| *H04L 29/06* | (2006.01) |
| *G06N 20/00* | (2019.01) |
| *G06F 21/55* | (2013.01) |
| *G06F 21/56* | (2013.01) |
| *G06F 16/28* | (2019.01) |
| *G06F 16/2457* | (2019.01) |
| *G06F 16/248* | (2019.01) |
| *G06F 16/29* | (2019.01) |
| *G06F 16/16* | (2019.01) |
| *G06F 16/17* | (2019.01) |
| *G06F 16/11* | (2019.01) |
| *G06F 16/13* | (2019.01) |
| *G06F 16/174* | (2019.01) |
| *G06F 16/23* | (2019.01) |
| *G06F 16/9535* | (2019.01) |
| *G06N 99/00* | (2019.01) |
| *H04L 9/32* | (2006.01) |
| *H04L 12/24* | (2006.01) |
| *H04L 12/715* | (2013.01) |
| *H04L 12/723* | (2013.01) |
| *H04L 29/08* | (2006.01) |
| *H04L 12/851* | (2013.01) |
| *H04W 84/18* | (2009.01) |
| *G06F 21/53* | (2013.01) |
| *G06F 3/0484* | (2013.01) |
| *H04L 1/24* | (2006.01) |
| *H04W 72/08* | (2009.01) |
| *H04L 9/08* | (2006.01) |
| *H04J 3/06* | (2006.01) |
| *H04J 3/14* | (2006.01) |
| *H04L 29/12* | (2006.01) |
| *H04L 12/813* | (2013.01) |
| *H04L 12/823* | (2013.01) |
| *H04L 12/801* | (2013.01) |
| *H04L 12/741* | (2013.01) |
| *H04L 12/833* | (2013.01) |
| *H04L 12/721* | (2013.01) |
| *G06F 3/0482* | (2013.01) |
| *G06T 11/20* | (2006.01) |
| *H04L 12/841* | (2013.01) |
| *H04L 12/725* | (2013.01) |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/235* (2019.01); *G06F 16/2322* (2019.01); *G06F 16/2365* (2019.01); *G06F 16/248* (2019.01); *G06F 16/24578* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *G06F 2221/033* (2013.01); *G06F 2221/2101* (2013.01); *G06F 2221/2105* (2013.01); *G06F 2221/2111* (2013.01); *G06F 2221/2115* (2013.01); *G06F 2221/2145* (2013.01); *H04L 67/22* (2013.01)

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,803 A | 4/1998 | Igarashi et al. |
| 5,742,829 A | 4/1998 | Davis et al. |
| 5,794,047 A | 8/1998 | Meier |
| 5,831,848 A | 11/1998 | Rielly et al. |
| 5,903,545 A | 5/1999 | Sabourin et al. |
| 6,012,096 A | 1/2000 | Link et al. |
| 6,026,362 A | 2/2000 | Kim et al. |
| 6,115,462 A | 9/2000 | Servi et al. |
| 6,141,595 A | 10/2000 | Gloudeman et al. |
| 6,144,962 A | 11/2000 | Weinberg et al. |
| 6,230,312 B1 | 5/2001 | Hunt |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |

(56) References Cited

U.S. PATENT DOCUMENTS

| | | |
|---|---|---|
| 6,351,843 B1 | 2/2002 | Berkley et al. |
| 6,353,775 B1 | 3/2002 | Nichols |
| 6,381,735 B1 | 4/2002 | Hunt |
| 6,499,137 B1 | 12/2002 | Hunt |
| 6,525,658 B2 | 2/2003 | Streetman et al. |
| 6,546,553 B1 | 4/2003 | Hunt |
| 6,597,663 B1 | 7/2003 | Rekhter |
| 6,611,896 B1 | 8/2003 | Mason, Jr. et al. |
| 6,629,123 B1 | 9/2003 | Hunt |
| 6,654,750 B1 | 11/2003 | Adams et al. |
| 6,718,414 B1 | 4/2004 | Doggett |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,965,861 B1 | 11/2005 | Dailey et al. |
| 6,983,323 B2 | 1/2006 | Cantrell et al. |
| 6,996,808 B1 | 2/2006 | Niewiadomski et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,089,583 B2 | 8/2006 | Mehra et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,162,643 B1 | 1/2007 | Sankaran et al. |
| 7,181,769 B1 | 2/2007 | Keanini et al. |
| 7,185,103 B1 | 2/2007 | Jain |
| 7,194,664 B1 | 3/2007 | Fung et al. |
| 7,203,740 B1 | 4/2007 | Putzolu et al. |
| 7,263,689 B1 | 8/2007 | Edwards et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,507 B2 | 4/2008 | Gazdik et al. |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,454,486 B2 | 11/2008 | Kaler et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,523,465 B2 | 4/2009 | Aamodt et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,571,478 B2 | 8/2009 | Munson et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,840,618 B2 | 11/2010 | Zhang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,135,847 B2 | 3/2012 | Pujol et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,280,683 B2 | 10/2012 | Finkler |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,463,860 B1 | 6/2013 | Guruswamy et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,588,081 B2 | 11/2013 | Salam et al. |
| 8,595,709 B2 | 11/2013 | Rao et al. |
| 8,600,726 B1 | 12/2013 | Varshney et al. |
| 8,612,530 B1 | 12/2013 | Sapovalovs et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,689,172 B2 | 4/2014 | Amaral et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |

(56) References Cited

U.S. PATENT DOCUMENTS

| | | |
|---|---|---|
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,924,941 B2 | 12/2014 | Krajec et al. |
| 8,931,043 B2 | 1/2015 | Cooper et al. |
| 8,954,546 B2 | 2/2015 | Krajec et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,063 B2 | 3/2015 | Krajec et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,135,145 B2 | 9/2015 | Voccio et al. |
| 9,152,789 B2 | 10/2015 | Natarajan et al. |
| 9,158,720 B2 | 10/2015 | Shirlen et al. |
| 9,160,764 B2 | 10/2015 | Stiansen et al. |
| 9,178,906 B1 | 11/2015 | Chen et al. |
| 9,185,127 B2 | 11/2015 | Neou et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,258,217 B2 | 2/2016 | Duffield et al. |
| 9,276,829 B2 | 3/2016 | Castro et al. |
| 9,281,940 B2 | 3/2016 | Matsuda et al. |
| 9,286,047 B1 | 3/2016 | Avramov et al. |
| 9,292,415 B2 | 3/2016 | Seto et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 7/2016 | Auger et al. |
| 9,397,902 B2 | 7/2016 | Dragon et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,483,334 B2 | 11/2016 | Walsh |
| 9,501,744 B1 | 11/2016 | Brisebois et al. |
| 9,531,589 B2 | 12/2016 | Clemm et al. |
| 9,552,221 B1 | 1/2017 | Pora |
| 9,563,517 B1 | 2/2017 | Natanzon et al. |
| 9,575,869 B2 | 2/2017 | Pechanec et al. |
| 9,575,874 B2 | 2/2017 | Gautallin et al. |
| 9,634,915 B2 | 4/2017 | Bley |
| 9,645,892 B1 | 5/2017 | Patwardhan |
| 9,658,942 B2 | 5/2017 | Bhat et al. |
| 9,665,474 B2 | 5/2017 | Li et al. |
| 9,684,453 B2 | 6/2017 | Holt et al. |
| 9,697,033 B2 | 7/2017 | Koponen et al. |
| 9,727,394 B2 | 8/2017 | Xun et al. |
| 9,736,041 B2 | 8/2017 | Lumezanu et al. |
| 9,749,145 B2 | 8/2017 | Banavalikar et al. |
| 9,800,608 B2 | 10/2017 | Korsunsky et al. |
| 9,804,830 B2 | 10/2017 | Raman et al. |
| 9,804,951 B2 | 10/2017 | Liu et al. |
| 9,813,307 B2 | 11/2017 | Walsh et al. |
| 9,813,516 B2 | 11/2017 | Wang |
| 9,904,584 B2 | 2/2018 | Konig et al. |
| 9,916,232 B2 | 3/2018 | Voccio et al. |
| 9,996,529 B2 | 6/2018 | McCandless et al. |
| 10,002,187 B2 | 6/2018 | McCandless et al. |
| 10,116,531 B2 | 10/2018 | Alizadeh Attar et al. |
| 10,394,692 B2 | 8/2019 | Liu et al. |
| 10,454,793 B2 | 10/2019 | Deen et al. |
| 10,454,999 B2 | 10/2019 | Eder |
| 10,476,982 B2 | 11/2019 | Tarre et al. |
| 10,652,225 B2 | 5/2020 | Koved et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0084158 A1 | 5/2003 | Saito et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0205536 A1 | 10/2004 | Newman et al. |
| 2004/0213221 A1 | 10/2004 | Civanlar et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0060403 A1 | 3/2005 | Bernstein et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0166066 A1 | 7/2005 | Ahuja et al. |
| 2005/0177829 A1 | 8/2005 | Vishwanath |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0158354 A1 | 7/2006 | Aberg et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0212556 A1 | 9/2006 | Yacoby et al. |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0124376 A1 | 5/2007 | Greenwell |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0180526 A1 | 8/2007 | Copeland, III |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |

(56) References Cited

U.S. PATENT DOCUMENTS

| | | |
|---|---|---|
| 2007/0214348 A1 | 9/2007 | Danielsen |
| 2007/0230415 A1 | 10/2007 | Malik |
| 2007/0250930 A1 | 10/2007 | Aziz et al. |
| 2007/0300061 A1 | 12/2007 | Kim et al. |
| 2008/0022385 A1 | 1/2008 | Crowell et al. |
| 2008/0046708 A1 | 2/2008 | Fitzgerald et al. |
| 2008/0052387 A1 | 2/2008 | Heinz et al. |
| 2008/0056124 A1 | 3/2008 | Nanda et al. |
| 2008/0066009 A1 | 3/2008 | Gardner et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0155245 A1 | 6/2008 | Lipscombe et al. |
| 2008/0201109 A1 | 8/2008 | Zill et al. |
| 2008/0232358 A1 | 9/2008 | Baker et al. |
| 2008/0250122 A1 | 10/2008 | Zsigmond et al. |
| 2008/0250128 A1 | 10/2008 | Sargent |
| 2008/0270199 A1 | 10/2008 | Chess et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0077543 A1 | 3/2009 | Siskind et al. |
| 2009/0106646 A1 | 4/2009 | Mollicone et al. |
| 2009/0133126 A1 | 5/2009 | Jang et al. |
| 2009/0192847 A1 | 7/2009 | Lipkin et al. |
| 2009/0241170 A1 | 9/2009 | Kumar et al. |
| 2009/0249302 A1 | 10/2009 | Xu et al. |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0005478 A1 | 1/2010 | Helfman et al. |
| 2010/0049839 A1 | 2/2010 | Parker et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0174813 A1 | 7/2010 | Hildreth et al. |
| 2010/0180016 A1 | 7/2010 | Bugwadia et al. |
| 2010/0188995 A1 | 7/2010 | Raleigh |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0083124 A1 | 4/2011 | Moskal et al. |
| 2011/0083125 A1 | 4/2011 | Komatsu et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153811 A1 | 6/2011 | Jeong et al. |
| 2011/0158088 A1 | 6/2011 | Lofstrand et al. |
| 2011/0167435 A1 | 7/2011 | Fang |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0231510 A1 | 9/2011 | Korsunsky et al. |
| 2011/0239194 A1 | 9/2011 | Braude |
| 2011/0246663 A1 | 10/2011 | Melsen et al. |
| 2011/0277034 A1 | 11/2011 | Hanson |
| 2011/0283266 A1 | 11/2011 | Gallagher et al. |
| 2011/0289301 A1 | 11/2011 | Allen et al. |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0011153 A1 | 1/2012 | Buchanan et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0167057 A1 | 6/2012 | Schmich et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0019008 A1 | 1/2013 | Jorgenson et al. |
| 2013/0038358 A1 | 2/2013 | Cook et al. |
| 2013/0055145 A1 | 2/2013 | Anthony et al. |
| 2013/0086272 A1 | 4/2013 | Chen et al. |
| 2013/0097706 A1 | 4/2013 | Titonis et al. |
| 2013/0103827 A1 | 4/2013 | Dunlap et al. |
| 2013/0107709 A1 | 5/2013 | Campbell et al. |
| 2013/0117748 A1 | 5/2013 | Cooper et al. |
| 2013/0122854 A1 | 5/2013 | Agarwal et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0160128 A1 | 6/2013 | Dolan-Gavitt et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283240 A1 | 10/2013 | Krajec et al. |
| 2013/0283281 A1 | 10/2013 | Krajec et al. |

(56) References Cited

U.S. PATENT DOCUMENTS

| | | |
|---|---|---|
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0326625 A1 | 12/2013 | Anderson et al. |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0033193 A1 | 1/2014 | Palaniappan |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0115403 A1 | 4/2014 | Rhee et al. |
| 2014/0137109 A1 | 5/2014 | Sharma et al. |
| 2014/0140213 A1 | 5/2014 | Raleigh et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0208296 A1 | 7/2014 | Dang et al. |
| 2014/0215443 A1 | 7/2014 | Voccio et al. |
| 2014/0215573 A1 | 7/2014 | Cepuran |
| 2014/0215621 A1 | 7/2014 | Xaypanya et al. |
| 2014/0280499 A1 | 9/2014 | Basavaiah et al. |
| 2014/0280908 A1 | 9/2014 | Rothstein et al. |
| 2014/0281030 A1 | 9/2014 | Cui et al. |
| 2014/0286174 A1 | 9/2014 | Iizuka et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0317278 A1 | 10/2014 | Kersch et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0128133 A1 | 5/2015 | Pohlmann |
| 2015/0138993 A1 | 5/2015 | Forster et al. |
| 2015/0142962 A1 | 5/2015 | Srinivas et al. |
| 2015/0170213 A1 | 6/2015 | O'Malley |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0347554 A1 | 12/2015 | Vasantham et al. |
| 2015/0356297 A1 | 12/2015 | Guri et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0021131 A1 | 1/2016 | Heilig |
| 2016/0026552 A1 | 1/2016 | Holden et al. |
| 2016/0034560 A1 | 2/2016 | Setayesh et al. |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0148251 A1 | 5/2016 | Thomas et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0234083 A1 | 8/2016 | Ahn et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |

(56) References Cited

U.S. PATENT DOCUMENTS

| | | | |
|---|---|---|---|
| 2016/0359711 | A1 | 12/2016 | Deen et al. |
| 2016/0359712 | A1 | 12/2016 | Alizadeh Attar et al. |
| 2016/0359740 | A1 | 12/2016 | Parasdehgheibi et al. |
| 2016/0359759 | A1 | 12/2016 | Singh et al. |
| 2016/0359872 | A1 | 12/2016 | Yadav et al. |
| 2016/0359877 | A1 | 12/2016 | Kulshreshtha et al. |
| 2016/0359878 | A1 | 12/2016 | Prasad et al. |
| 2016/0359879 | A1 | 12/2016 | Deen et al. |
| 2016/0359880 | A1 | 12/2016 | Pang et al. |
| 2016/0359881 | A1 | 12/2016 | Yadav et al. |
| 2016/0359888 | A1 | 12/2016 | Gupta et al. |
| 2016/0359889 | A1 | 12/2016 | Yadav et al. |
| 2016/0359890 | A1 | 12/2016 | Deen et al. |
| 2016/0359891 | A1 | 12/2016 | Pang et al. |
| 2016/0359897 | A1 | 12/2016 | Yadav et al. |
| 2016/0359905 | A1 | 12/2016 | Touboul et al. |
| 2016/0359912 | A1 | 12/2016 | Gupta et al. |
| 2016/0359913 | A1 | 12/2016 | Gupta et al. |
| 2016/0359914 | A1 | 12/2016 | Deen et al. |
| 2016/0359915 | A1 | 12/2016 | Gupta et al. |
| 2016/0359917 | A1 | 12/2016 | Rao et al. |
| 2016/0373481 | A1 | 12/2016 | Sultan et al. |
| 2017/0024453 | A1 | 1/2017 | Raja et al. |
| 2017/0034018 | A1 | 2/2017 | Parasdehgheibi et al. |
| 2017/0048121 | A1 | 2/2017 | Hobbs et al. |
| 2017/0070582 | A1 | 3/2017 | Desai et al. |
| 2017/0085483 | A1 | 3/2017 | Mihaly et al. |
| 2017/0208487 | A1 | 7/2017 | Ratakonda et al. |
| 2017/0250880 | A1 | 8/2017 | Akens et al. |
| 2017/0250951 | A1 | 8/2017 | Wang et al. |
| 2017/0289067 | A1 | 10/2017 | Lu et al. |
| 2017/0295141 | A1 | 10/2017 | Thubert et al. |
| 2017/0302691 | A1 | 10/2017 | Singh et al. |
| 2017/0324518 | A1 | 11/2017 | Meng et al. |
| 2017/0331747 | A1 | 11/2017 | Singh et al. |
| 2017/0346736 | A1 | 11/2017 | Chander et al. |
| 2017/0364380 | A1 | 12/2017 | Frye, Jr. et al. |
| 2018/0006911 | A1 | 1/2018 | Dickey |
| 2018/0007115 | A1 | 1/2018 | Nedeltchev et al. |
| 2018/0013670 | A1 | 1/2018 | Kapadia et al. |
| 2018/0145906 | A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| EP | 3069241 B1 | 8/2018 |
| JP | 2009-016906 | 1/2009 |
| KR | 1394338 | 5/2014 |
| WO | WO 01/45370 A1 | 6/2001 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2015/118454 A1 | 8/2015 |
| WO | WO 2016/004075 | 1/2016 |
| WO | WO 2016/019523 | 2/2016 |

OTHER PUBLICATIONS

Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Arista Networks, Inc., "Application Visibility and Network Telemtry using Splunk," Arista White Paper, Nov. 2013, 11 pages.
Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambala.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015 pp. 1-13.
Bauch, Petr, "Reader's Report of Master's Thesis, Analysis and Testing of Distributed NoSQL Datastore Riak," May 28, 2015, Brno. 2 pages.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, filed Jan. 21, 2015, entitled "Monitoring Network Policy Compliance."
Breen, Christopher, "MAC 911, How to dismiss Mac App Store Notifications," Macworld.com, Mar. 24, 2014, 3 pages.
Brocade Communications Systems, Inc., "Chapter 5—Configuring Virtual LANs (VLANs)," Jun. 2009, 38 pages.
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the 18th ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Chou, C.W., et al., "Optical Clocks and Relativity," Science vol. 329, Sep. 24, 2010, pp. 1630-1633.
Cisco Systems, "Cisco Network Analysis Modules (NAM) Tutorial," Cisco Systems, Inc., Version 3.5.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Addressing Compliance from One Infrastructure: Cisco Unified Compliance Solution Framework," 2014.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Application Dependency Mapping Service," 2009.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.

(56) References Cited

OTHER PUBLICATIONS

Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Systems, Inc., "Cisco Application Visibility and Control," Oct. 2011, 2 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Systems, Inc., "Cisco Tetration Platform Data Sheet", Updated Mar. 5, 2018, 21 pages.
Cisco Technology, Inc., "Cisco IOS Software Release 12.4T Features and Hardware Support," Feb. 2009, 174 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Duan, Yiheng, et al., Detective: Automatically Identify and Analyze Malware Processes in Forensic Scenarios via DLLs, IEEE ICC 2015—Next Generation Networking Symposium, pp. 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
Foundation for Intelligent Physical Agents, "FIPA Agent Message Transport Service Specification," Dec. 3, 2002, http://www.fipa.org; 15 pages.
George, Ashley, et al., "NetPal: A Dynamic Network Administration Knowledge Base," 2008, pp. 1-14.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.

Hideshima, Yusuke, et al., "STARMINE: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015 https://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection," IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab Sku, "VMware Hands-on Labs—HOL-SDC-1301" Version: 20140321-160709, 2013; http://docs.hol.vmware.com/HOL-2013/holsdc-1301_html_en/ (part 1 of 2).
Lab Sku, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceed-

(56) References Cited

OTHER PUBLICATIONS ings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Online Collins English Dictionary, 1 page (Year: 2018).
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Voris, Jonathan, et al., "Bait and Snitch: Defending Computer Systems with Decoys," Columbia University Libraries, Department of Computer Science, 2013, pp. 1-25.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "CANTINA: A Content-Based Approach to Detecting Phishing Web Sites," May 8-12, 2007, pp. 639-648.
"Borg: The Predecessor to Kubernetes," Apr. 23, 2015, 2 pages, available at https://kubernetes.io/blog/2015/04/borg-predecessor-to-kubernetes/.
"Kubernetes Components," Aug. 28, 2020, 4 pages, available at https://kubernetes.io/docs/concepts/overview/components/.
"Nodes," Jan. 12, 2021, 6 pages, available at https://kubernetes.io/docs/concepts/architecture/nodes/.
"OpenTracing," 10 pages, available at https://github.com/opentracing/specification/blob/master/specification.md.
"Pods," Jan. 12, 2021, 5 pages, available at https://kubernetes.io.docs/concepts/workloads/pods/pod/.
"The OpenTracing Semantic Specification," 8 pages, available at https://opentracing.io/docs/.
"What is Kubernetes," Oct. 22, 2020, 3 pages, available at https://kubernetes.io/docs/concepts/overview/what-is-kubernetes/.
Aniszczyk, Chris, "Distributed Systems Tracing with Zipkin" Jun. 7, 2012, 3 pages, available at https://blog.twitter.com/engineering/en_us/a/2012/distributed-systems-tracing-with-zipkin.html.
Ayers, Andrew, et al: "TraceBack: First Fault Diagnosis by Reconstruction of Distributed Control Flow," Proceedings of the 2009 ACM SIGPLAN Conference on Programming Language Design and Implementation, PLDI '09, vol. 40, No. 6, Jun. 12, 2005, 13 pages.
Baah, George K., et al: "The Probabilistic Program Dependence Graph and Its Application to Fault Diagnosis," IEEE Transactions on Software Engineering, IEEE Service Center, Los Alamitos, CA, US, vol. 36, No. 4, Jul. 1, 2010 (Jul. 1, 2010), pp. 528-545, XP011299543, ISSN: 0098-5589.
Choi, Chang Ho, et al: "CSMonitor: A Visual Client/Server Monitor for CORBA-based Distributed Applications," Software Engineering Conference, 1998. Proceedings. 1998 Asia Pacific Taipei, Taiwan Dec. 2-4, 1998, Los Alamitos, CA, USA, IEEE Comput. Soc, US, Dec. 2, 1998, pp. 338-345, XP010314829, DOI: 10.1109/APSEC.1998.733738: ISBN: 978-0-8186-9183-6.
Grove, David, "Call Graph Construction in Object-Oriented Languages", ACM OOPSLA, Oct. 1997, ACM OOPSLA, 18 pages.
Ihler, Alexander, et al: "Learning to Detect Events With Markov-Modulated Poisson Processes," ACM Transactions on Knowledge Discovery From Data, vol. 1, No. 3, Dec. 1, 2007, pp. 13-1 to 13-23.
Moe, Johan, et al: "Understanding Distributed Systems Via Execution Trace Data," May 12-13, 2001, 8 pages.
Sigelman, Benjamin H., et al., "Dapper, a Large-Scale Distributed Systems Tracing Infrastructure," Google Technical Report dapper-2010-1, Apr. 2010, 14 pages, available at https://research.google/pubs/pub36356/.

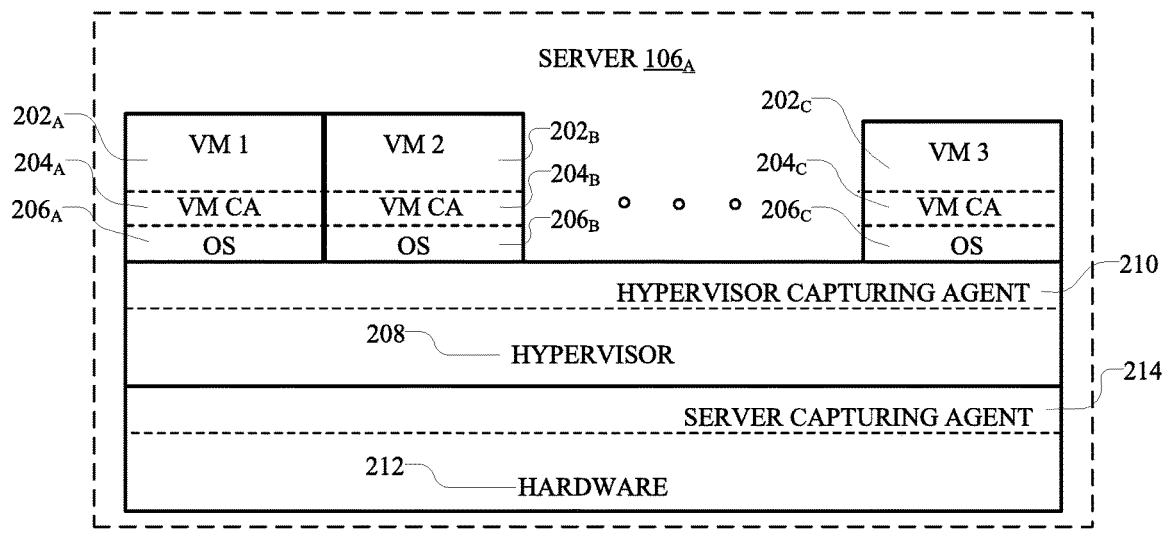
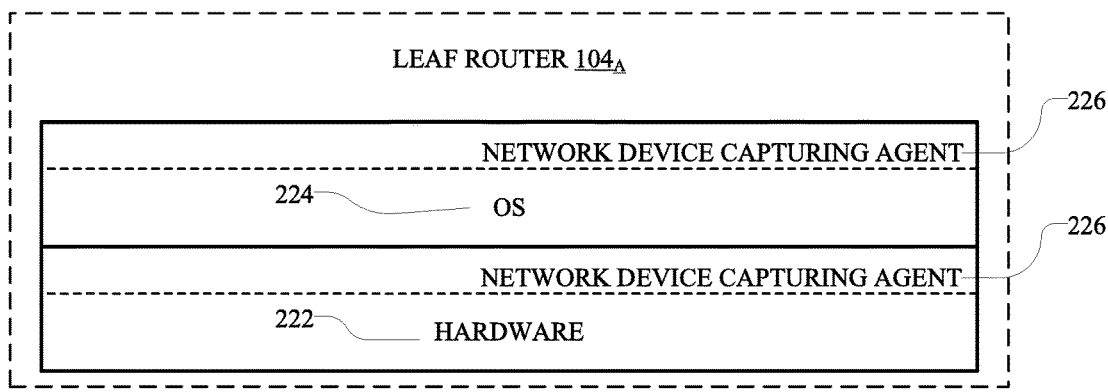

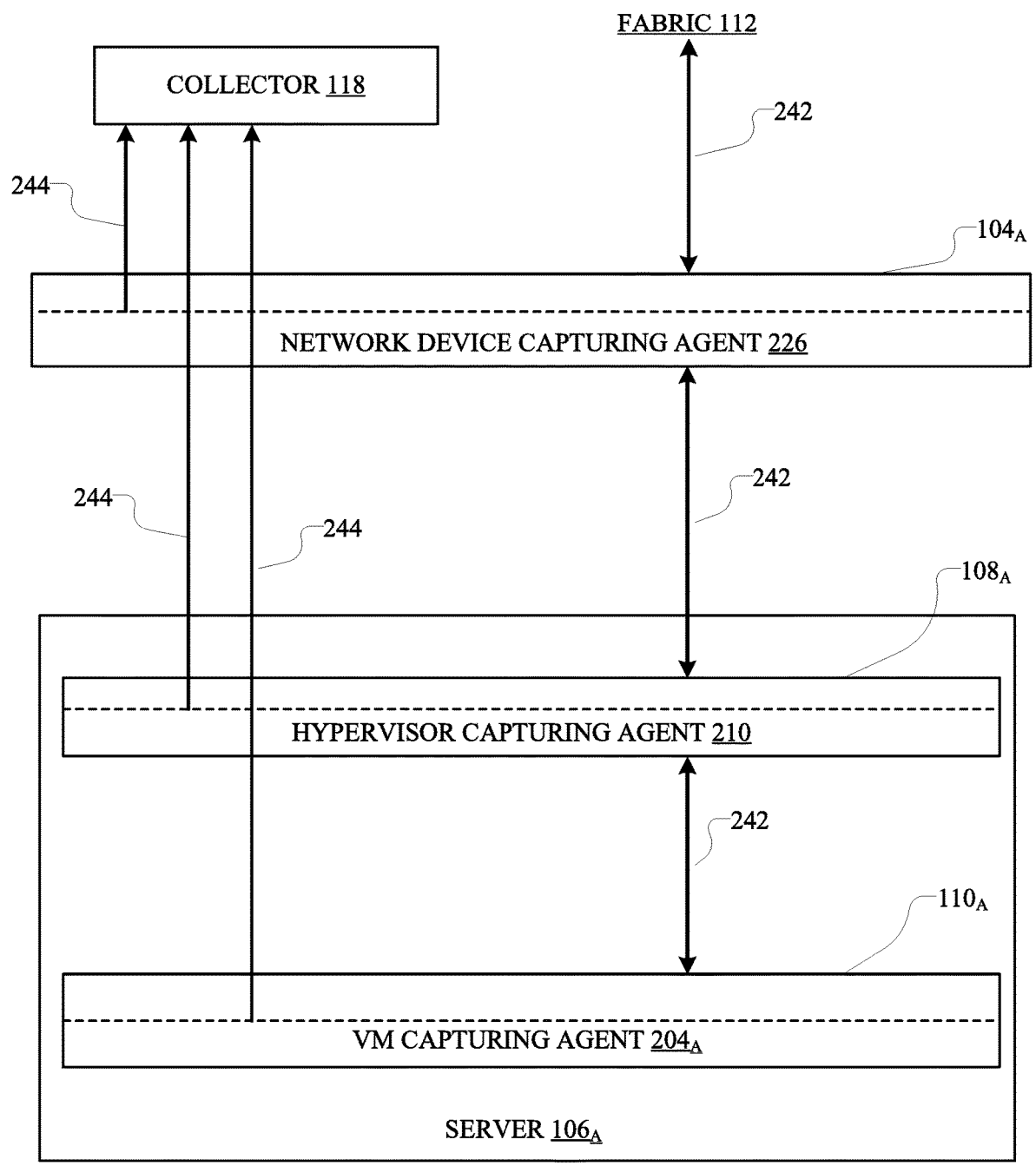

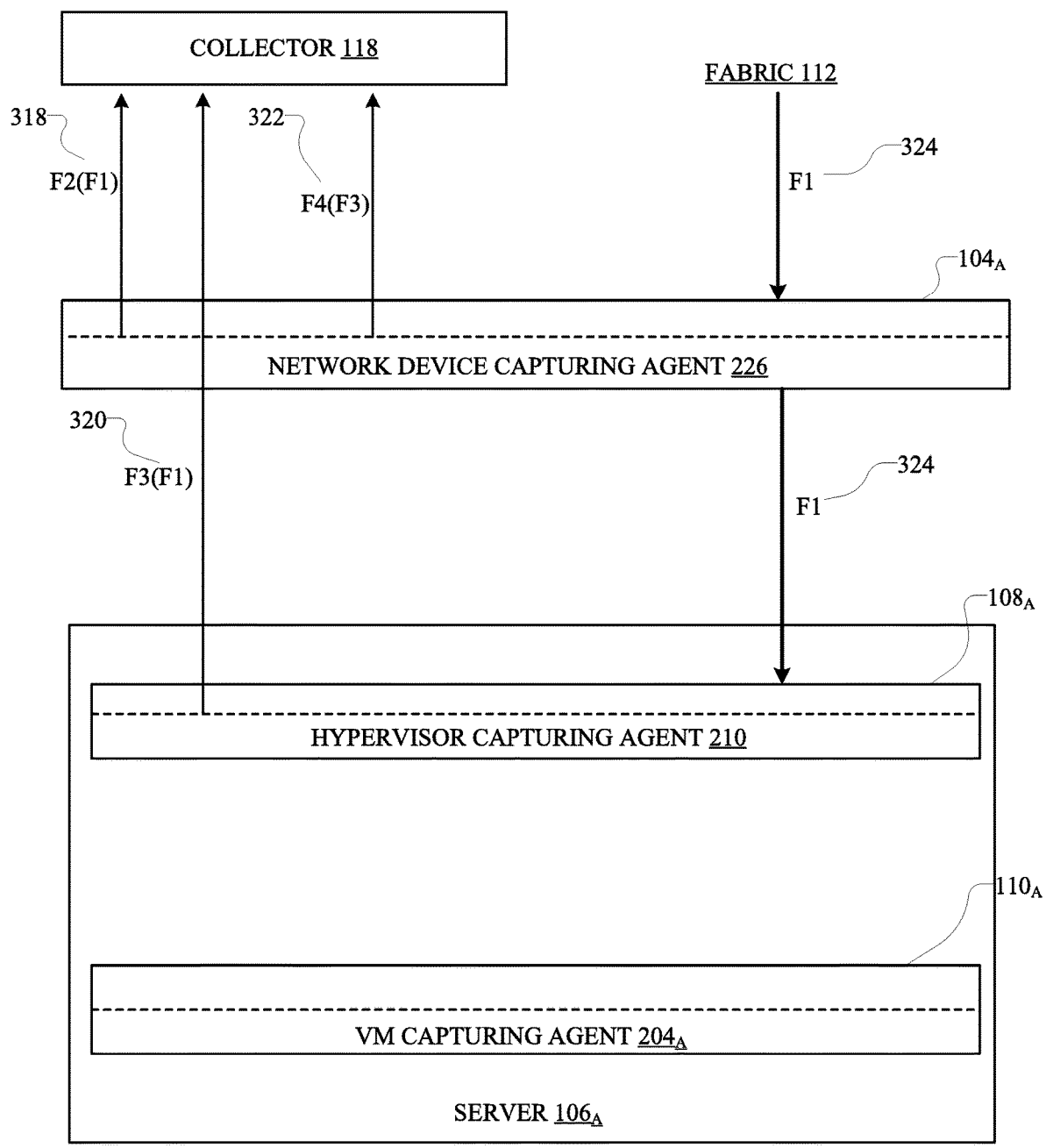

|  | VM CA 204$_A$ | HYPERVISOR CA 210 | NETWORK DEVICE CA 226 |
|---|---|---|---|
| FLOW 602 (VM 110$_A$) | Reported | Reported | Reported |
| FLOW 604 (HYPERVISOR 108$_A$) | Not Reported | Reported | Reported |
| FLOW 606 (LEAF ROUTER 104$_A$) | Not Reported | Not Reported | Reported |

TECHNOLOGIES FOR ANNOTATING PROCESS AND USER INFORMATION FOR NETWORK FLOWS

CROSS-REFERENCE TO RELATED APPLICATIONS

This application is a continuation of U.S. application Ser. No. 15/152,163, filed on May 11, 2016, which in turn, claims priority to U.S. Provisional Application No. 62/171,899, filed on Jun. 5, 2015, the contents of which are incorporated herein by reference their entirety.

TECHNICAL FIELD

The present technology pertains to network analytics, and more specifically to annotating process and user information in a network environment.

BACKGROUND

In a network environment, capturing agents or sensors can be placed at various devices or elements in the network to collect flow data and network statistics from different locations. The collected data from the capturing agents can be analyzed to monitor and troubleshoot the network. The data collected from the capturing agents can provide valuable details about the status, security, or performance of the network, as well as any network elements. Information about the capturing agents can also help interpret the data from the capturing agents, in order to infer or ascertain additional details from the collected data. For example, understanding the placement of a capturing agent relative to other capturing agents in the network can provide a context to the data reported by the capturing agents, which can further help identify specific patterns or conditions in the network. Unfortunately, however, information gathered from the capturing agents distributed throughout the network is often limited and may not include certain types of useful information. Moreover, as the network grows and changes, the information can quickly become outdated.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates a schematic diagram of an example capturing agent deployment in a virtualized environment;

FIG. 2B illustrates a schematic diagram of an example capturing agent deployment in an example network device;

FIG. 2C illustrates a schematic diagram of an example reporting system in an example capturing agent topology;

FIGS. 3A through 3F illustrate schematic diagrams of example configurations for reporting flows captured by capturing agents in an example capturing agent topology;

FIG. 6 illustrates a table of an example mapping of flow reports to capturing agents;

DESCRIPTION OF EXAMPLE EMBODIMENTS

Figure 1:
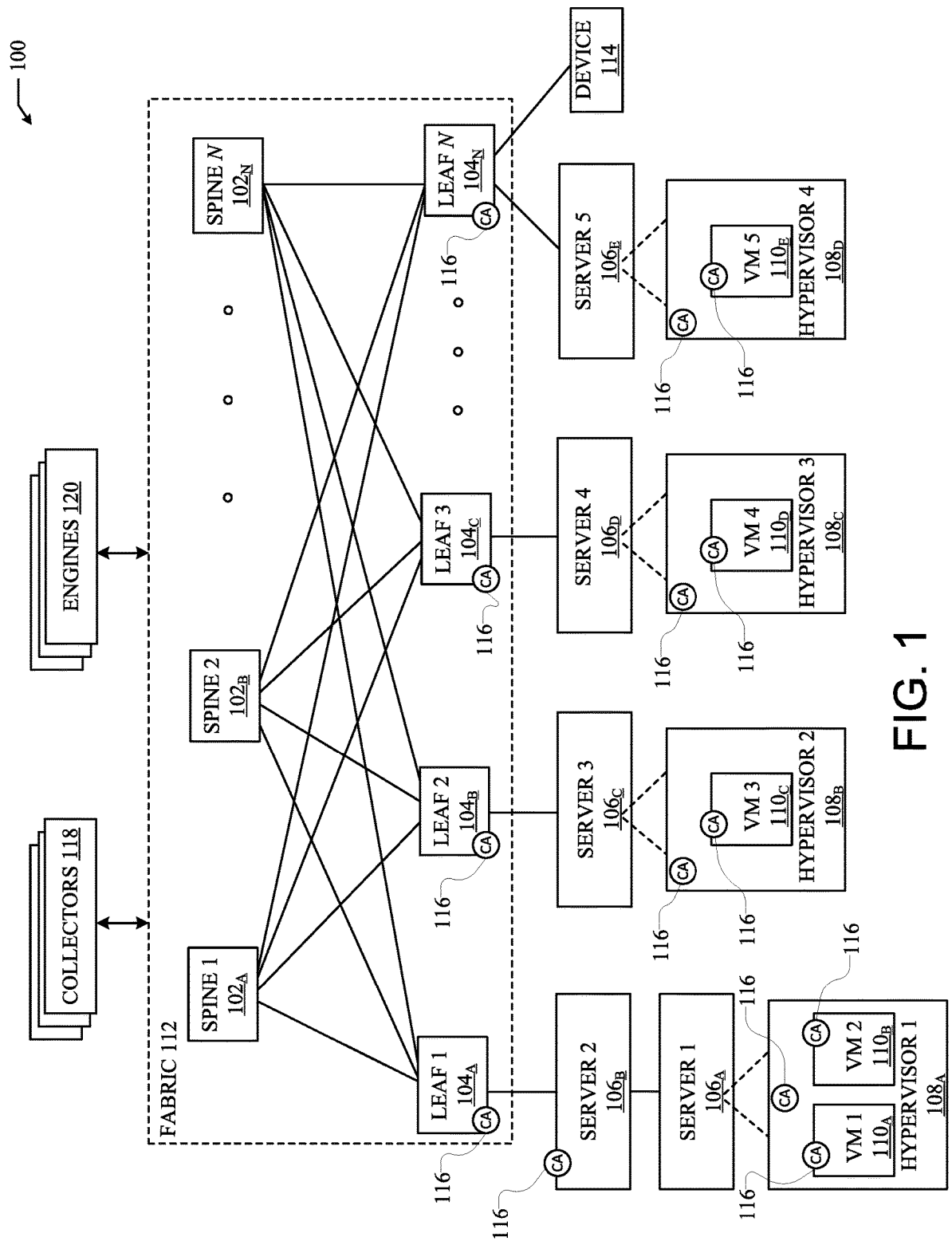
FIG. 1 illustrates a diagram of an example network environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to annotate process and user information related to network flows captured by various capturing agents or sensors deployed throughout a virtualized compute environment. The capturing agents can be packet inspection sensors configured to monitor, capture, and/or report network traffic information at the various locations. The capturing agents can be deployed on virtual machines, hypervisors, servers, and network devices (e.g., physical switches) on the network. The various capturing agents can capture traffic from their respective locations (e.g., traffic processed by their hosts), and report captured data to one or more devices, such as a collector system or a processing engine. The captured data can include any traffic and/or process information captured by the capturing agents including reports or control flows generated by other capturing agents.

The data reported from the various capturing agents can be used to determine the particular process or user involved with a given flow being reported. For example, capturing agents deployed throughout the network can be configured to identify the process or operating system user account that is responsible for generating or processing a network flow and report such findings to a collector in the form of a control flow. The reported process and user information can be used to understand the relationships of the flows and the corresponding processes and users, and may drive further analytics on the network.

Disclosed are systems, methods, and computer-readable storage media for annotating process and user information in a network. A system may include a virtual machine, a hypervisor hosting the virtual machine, and a network device such as a switch communicatively connected to the hypervisor. The virtual machine can have a first capturing agent or sensor that is configured to monitor a first network flow associated with the virtual machine. The first capturing agent can generate a first control flow based on the first network flow. The first control flow can include first metadata that describes the first network flow. The first capturing agent can label the first control flow with a first identifier of a first process executing on the virtual machine, thus yielding a first labeled control flow. The first process can be associated with the first network flow. The first capturing agent can then transmit the labeled control flow to a collector via the network.

The hypervisor may also have a second capturing agent. The second capturing agent can be configured to monitor a second network flow associated with the hypervisor, and the second network flow can include at least the first labeled control flow. The second capturing agent can generate a second control flow based on the second network flow. The second control flow can include second metadata that describes the second network flow. The second control flow can then label the second control flow with a second identifier of a second process executing on the hypervisor, thus yielding a second labeled control flow. The second process can be associated with the second network flow. Next, the second capturing agent can transmit the second labeled control flow to the collector via the network.

In addition, the network device can have a third capturing agent that is configured to monitor a third network flow associated with the network device. The third network flow can include the first labeled control flow and/or the second labeled control flow. The third capturing agent can generate a third control flow based on the third network flow, and the third control flow may include third metadata describing the third network flow. The third capturing agent can then label the third control flow with a third identifier of a third process that is executing on the network device and associated with the third network flow, thus yielding a third labeled control flow. Finally, the third capturing agent can transmit the third labeled control flow to the collector via the network.

Description

Figure 9:
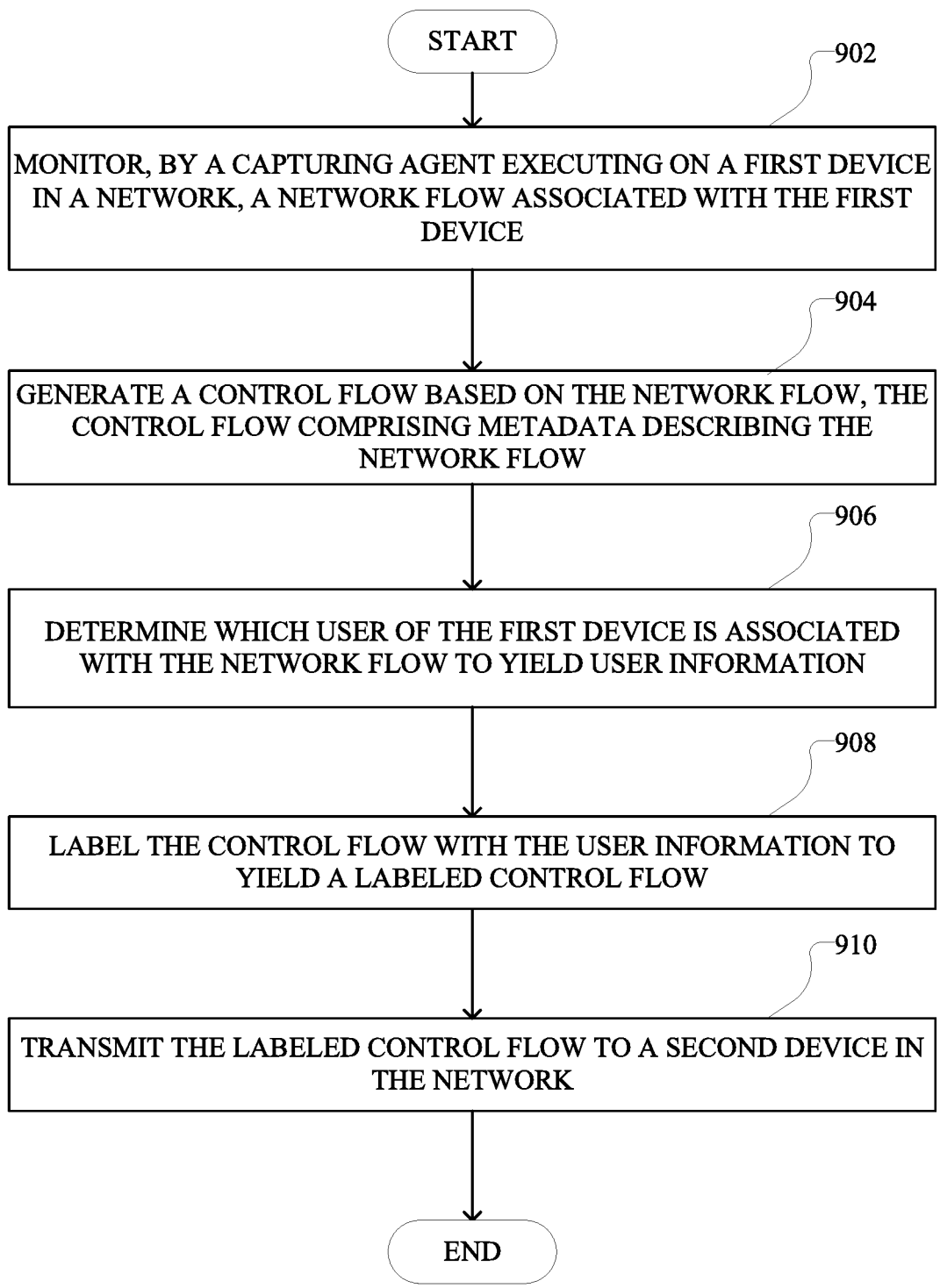
FIG. 9 illustrates an example method embodiment related to user information.
Figure 10:
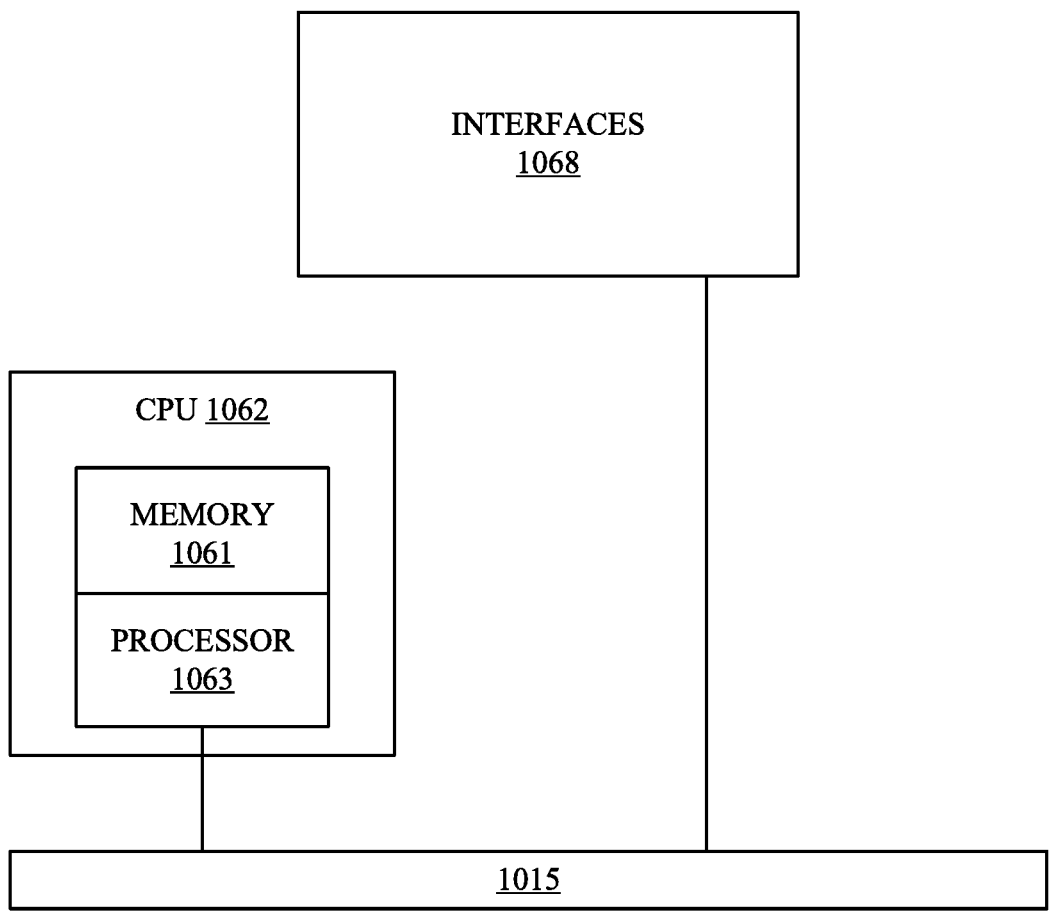
FIG. 10 illustrates an example network device.
Figure 11A:
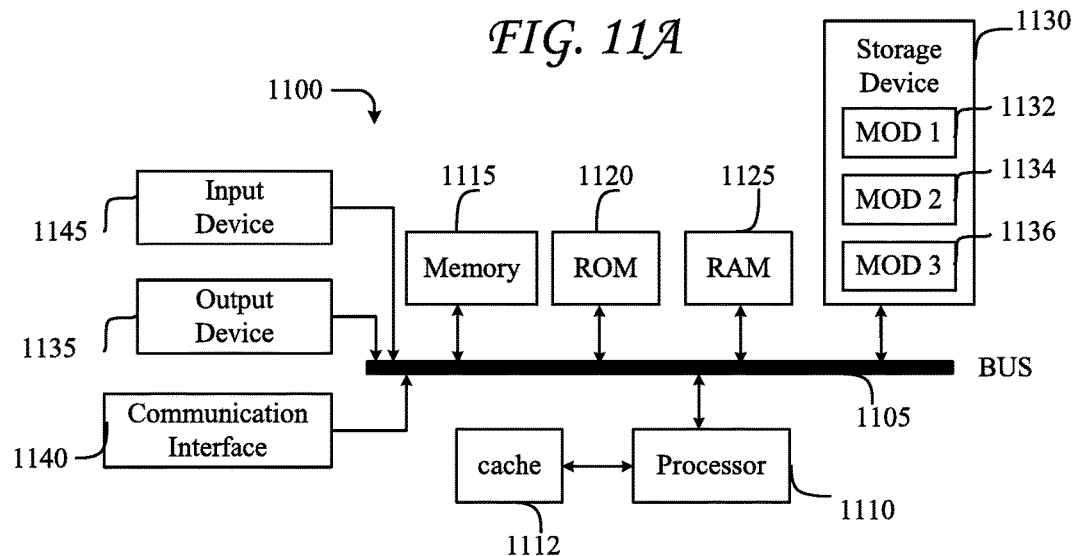
FIGS. 11A and 11B illustrate example system embodiments.
Figure 11B:
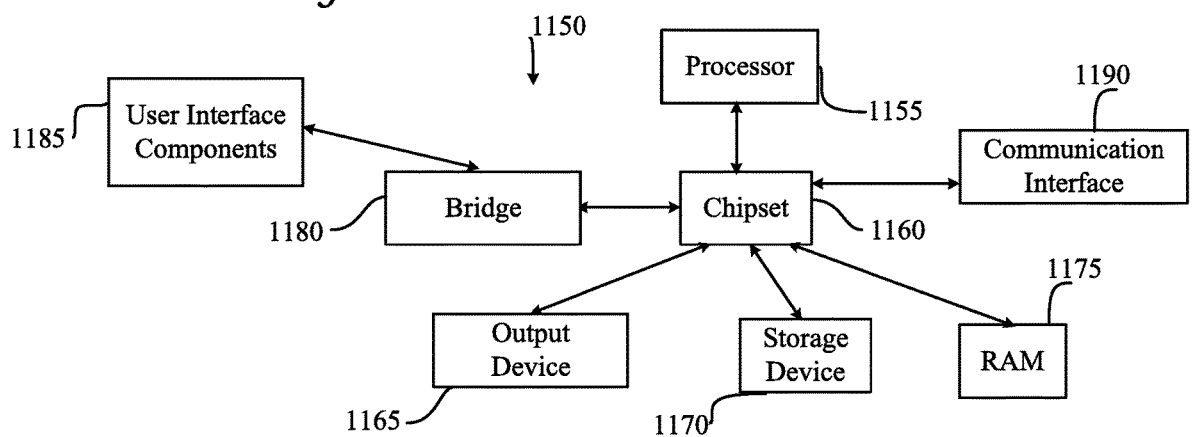

The disclosed technology addresses the need in the art for understanding data reported from capturing agents on a virtualized network. Disclosed are systems, methods, and computer-readable storage media for determining relative placement and topology of capturing agents deployed throughout a network. A description of an example network environment, as illustrated in FIG. 1, is first disclosed herein. A discussion of capturing agents and capturing agent topologies in virtualized environments, as illustrated in FIGS. 2A-C, will then follow. The discussion follows with a discussion of mechanisms for determining relative placement and topology information for capturing agents in a network environment, as illustrated in FIGS. 3-7. Then, example methods practiced according to the various embodiments disclosed herein will be discussed, as illustrated in FIGS. 9-10. The discussion then concludes with a description of example devices, as illustrated in FIGS. 10 and 11A-B. These variations shall be described herein as the various embodiments are set forth. The disclosure now turns to FIG. 1.

FIG. 1 illustrates a diagram of example network environment 100. Fabric 112 can represent the underlay (i.e., physical network) of network environment 100. Fabric 112 can include spine routers 1-N ($102_{A\text{-}N}$) (collectively "102") and leaf routers 1-N (104A-N) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-5 ($106_{A\text{-}E}$) (collectively "106"), hypervisors 1-4 ($108_A\text{-}108_D$) (collectively "108"), and virtual machines (VMs) 1-5 ($110_A\text{-}110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, a collector 118 (further described below), an engine 120 (further described below), etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs 11 $O_{A\text{-}B}$.

In some cases, VMs 110 and/or hypervisors 108 can be migrated to other servers 106. For example, VM $110_A$ can be migrated to server 106c and hypervisor $108_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include capturing agent 116 (also referred to as a "sensor") configured to capture network data, and report any portion of the captured data to collector 118. Capturing agents 116 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 118.

For example, a VM capturing agent can run as a process, kernel module, or kernel driver on the guest operating system installed in a VM and configured to capture data (e.g., network and/or system data) processed (e.g., sent, received, generated, etc.) by the VM. Additionally, a hypervisor capturing agent can run as a process, kernel module, or kernel driver on the host operating system installed at the hypervisor layer and configured to capture data (e.g., network and/or system data) processed (e.g., sent, received, generated, etc.) by the hypervisor. A server capturing agent can run as a process, kernel module, or kernel driver on the host operating system of a server and configured to capture data (e.g., network and/or system data) processed (e.g., sent, received, generated, etc.) by the server. And a network device capturing agent can run as a process or component in a network device, such as leaf routers 104, and configured to capture data (e.g., network and/or system data) processed (e.g., sent, received, generated, etc.) by the network device.

Capturing agents 116 or sensors can be configured to report the observed data and/or metadata about one or more packets, flows, communications, processes, events, and/or activities to collector 118. For example, capturing agents 116 can capture network data as well as information about the system or host of the capturing agents 116 (e.g., where the capturing agents 116 are deployed). Such information can also include, for example, data or metadata of active or previously active processes of the system, operating system user identifiers, metadata of files on the system, system alerts, networking information, etc. Capturing agents 116 may also analyze all the processes running on the respective VMs, hypervisors, servers, or network devices to determine specifically which process is responsible for a particular flow of network traffic. Similarly, capturing agents 116 may determine which operating system user(s) is responsible for a given flow. Reported data from capturing agents 116 can provide details or statistics particular to one or more tenants. For example, reported data from a subset of capturing agents 116 deployed throughout devices or elements in a tenant space can provide information about the performance, use, quality, events, processes, security status, characteristics, statistics, patterns, conditions, configurations, topology, and/or any other information for the particular tenant space.

Collectors 118 can be one or more devices, modules, workloads and/or processes capable of receiving data from capturing agents 116. Collectors 118 can thus collect reports and data from capturing agents 116. Collectors 118 can be deployed anywhere in network environment 100 and/or even on remote networks capable of communicating with network environment 100. For example, one or more collectors can be deployed within fabric 112 or on one or more of the servers 106. One or more collectors can be deployed outside of fabric 112 but connected to one or more leaf routers 104. Collectors 118 can be part of servers 106 and/or separate servers or devices (e.g., device 114). Collectors 118 can also be implemented in a cluster of servers.

Collectors 118 can be configured to collect data from capturing agents 116. In addition, collectors 118 can be implemented in one or more servers in a distributed fashion. As previously noted, collectors 118 can include one or more collectors. Moreover, each collector can be configured to receive reported data from all capturing agents 116 or a subset of capturing agents 116. For example, a collector can be assigned to a subset of capturing agents 116 so the data received by that specific collector is limited to data from the subset of capturing agents.

Collectors 118 can be configured to aggregate data from all capturing agents 116 and/or a subset of capturing agents 116. Moreover, collectors 118 can be configured to analyze some or all of the data reported by capturing agents 116. For example, collectors 118 can include analytics engines (e.g., engines 120) for analyzing collected data. Environment 100 can also include separate analytics engines 120 configured to analyze the data reported to collectors 118. For example, engines 120 can be configured to receive collected data from collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or perform any other analytics functions.

While collectors 118 and engines 120 are shown as separate entities, this is for illustration purposes as other configurations are also contemplated herein. For example, any of collectors 118 and engines 120 can be part of a same or separate entity. Moreover, any of the collector, aggregation, and analytics functions can be implemented by one entity (e.g., collectors 118) or separately implemented by multiple entities (e.g., engine 120 and/or collectors 118).

Each of the capturing agents 116 can use a respective address (e.g., internet protocol (IP) address, port number, etc.) of their host to send information to collectors 118 and/or any other destination. Collectors 118 may also be associated with their respective addresses such as IP addresses. Moreover, capturing agents 116 can periodically send information about flows they observe to collectors 118. Capturing agents 116 can be configured to report each and every flow they observe. Capturing agents 116 can report a list of flows that were active during a period of time (e.g., between the current time and the time of the last report). The consecutive periods of time of observance can be represented as pre-defined or adjustable time series. The series can be adjusted to a specific level of granularity. Thus, the time periods can be adjusted to control the level of details in statistics and can be customized based on specific requirements, such as security, scalability, storage, etc. The time series information can also be implemented to focus on more important flows or components (e.g., VMs) by varying the time intervals. The communication channel between a capturing agent and collector 118 can also create a flow in every reporting interval. Thus, the information transmitted or reported by capturing agents 116 can also include information about the flow created by the communication channel.

FIG. 2A illustrates a schematic diagram of an example capturing agent deployment 200 in a virtualized environment. Server 106$_A$ can execute and host one or more VMs 202$_{A-C}$ (collectively "202"). VMs 202$_{A-C}$ can be similar to VMs 110$_{A-E}$ of FIG. 1. For example, VM 1 (202$_A$) of FIG. 2A can be VM 1 (110$_A$) of FIG. 1, and so forth. VMs 202 can be configured to run workloads (e.g., applications, services, processes, functions, etc.) based on hardware resources 212 on server 106$_A$. VMs 202 can run on guest operating systems 206$_A$-c (collectively "206") on a virtual operating platform provided by hypervisor 208. Each VM 202 can run a respective guest operating system 206 which can be the same or different as other guest operating systems 206 associated with other VMs 202 on server 106$_A$. Each of guest operating systems 206 can execute one or more processes, which may in turn be programs, applications, modules, drivers, services, widgets, etc. Each of guest operating systems 206 may also be associated with one or more user accounts. For example, many popular operating systems such as LINUX, UNIX, WINDOWS, MAC OS, etc., offer multi-user environments where one or more users can use the system concurrently and share software/hardware resources. One or more users can sign in or log in to their user accounts associated with the operating system and run various workloads. Moreover, each VM 202 can have one or more network addresses, such as an internet protocol (IP) address. VMs 202 can thus communicate with hypervisor 208, server $106_A$, and/or any remote devices or networks using the one or more network addresses.

Hypervisor 208 (otherwise known as a virtual machine monitor) can be a layer of software, firmware, and/or hardware that creates and runs VMs 202. Guest operating systems 206 running on VMs 202 can share virtualized hardware resources created by hypervisor 208. The virtualized hardware resources can provide the illusion of separate hardware components. Moreover, the virtualized hardware resources can perform as physical hardware components (e.g., memory, storage, processor, network interface, etc.), and can be driven by hardware resources 212 on server $106_A$. Hypervisor 208 can have one or more network addresses, such as an internet protocol (IP) address, to communicate with other devices, components, or networks. For example, hypervisor 208 can have a dedicated IP address which it can use to communicate with VMs 202, server $106_A$, and/or any remote devices or networks.

Hardware resources 212 of server $106_A$ can provide the underlying physical hardware that drive operations and functionalities provided by server $106_A$, hypervisor 208, and VMs 202. Hardware resources 212 can include, for example, one or more memory resources, one or more storage resources, one or more communication interfaces, one or more processors, one or more circuit boards, one or more buses, one or more extension cards, one or more power supplies, one or more antennas, one or more peripheral components, etc. Additional examples of hardware resources are described below with reference to FIGS. 10 and 11A-B.

Server $106_A$ can also include one or more host operating systems (not shown). The number of host operating system can vary by configuration. For example, some configurations can include a dual boot configuration that allows server $106_A$ to boot into one of multiple host operating systems. In other configurations, server $106_A$ may run a single host operating system. Host operating systems can run on hardware resources 212. In some cases, hypervisor 208 can run on, or utilize, a host operating system on server $106_A$. Each of the host operating systems can execute one or more processes, which may be programs, applications, modules, drivers, services, widgets, etc. Each of the host operating systems may also be associated with one or more OS user accounts.

Server $106_A$ can also have one or more network addresses, such as an internet protocol (IP) address, to communicate with other devices, components, or networks. For example, server $106_A$ can have an IP address assigned to a communications interface from hardware resources 212, which it can use to communicate with VNIs 202, hypervisor 208, leaf router $104_A$ in FIG. 1, collectors 118 in FIG. 1, and/or any remote devices or networks.

VM capturing agents $204_{A-C}$ (collectively "204") can be deployed on one or more of VMs 202. V1\4 capturing agents 204 can be data and packet inspection agents or sensors deployed on VMs 202 to capture packets, flows, processes, events, traffic, and/or any data flowing into, out of, or through VMs 202. VM capturing agents 204 can be configured to export or report any data collected or captured by the capturing agents 204 to a remote entity, such as collectors 118, for example. VM capturing agents 204 can communicate or report such data using a network address of the respective VMs 202 (e.g., VM IP address).

VM capturing agents 204 can capture and report any traffic (e.g., packets, flows, etc.) sent, received, generated, and/or processed by VMs 202. For example, capturing agents 204 can report every packet or flow of communication sent and received by VMs 202. Such communication channel between capturing agents 204 and collectors 108 creates a flow in every monitoring period or interval and the flow generated by capturing agents 204 may be denoted as a control flow. Moreover, any communication sent or received by VMs 202, including data reported from capturing agents 204, can create a network flow. VM capturing agents 204 can report such flows in the form of a control flow to a remote device, such as collectors 118 illustrated in FIG. 1. VM capturing agents 204 can report each flow separately or aggregated with other flows. When reporting a flow via a control flow, VM capturing agents 204 can include a capturing agent identifier that identifies capturing agents 204 as reporting the associated flow. VM capturing agents 204 can also include in the control flow a flow identifier, an IP address, a timestamp, metadata, a process ID, an OS username associated with the process ID, and any other information, as further described below. In addition, capturing agents 204 can append the process and user information (i.e., which process and/or user is associated with a particular flow) to the control flow. The additional information as identified above can be applied to the control flow as labels. Alternatively, the additional information can be included as part of a header, a trailer, or a payload.

VM capturing agents 204 can also report multiple flows as a set of flows. When reporting a set of flows, VM capturing agents 204 can include a flow identifier for the set of flows and/or a flow identifier for each flow in the set of flows. VM capturing agents 204 can also include one or more timestamps and other information as previously explained.

VM capturing agents 204 can run as a process, kernel module, or kernel driver on guest operating systems 206 of VMs 202. VM capturing agents 204 can thus monitor any traffic sent, received, or processed by VMs 202, any processes running on guest operating systems 206, any users and user activities on guest operating system 206, any workloads on VMs 202, etc.

Hypervisor capturing agent 210 can be deployed on hypervisor 208. Hypervisor capturing agent 210 can be a data inspection agent or a sensor deployed on hypervisor 208 to capture traffic (e.g., packets, flows, etc.) and/or data flowing through hypervisor 208. Hypervisor capturing agent 210 can be configured to export or report any data collected or captured by hypervisor capturing agent 210 to a remote entity, such as collectors 118, for example. Hypervisor capturing agent 210 can communicate or report such data using a network address of hypervisor 208, such as an IP address of hypervisor 208.

Because hypervisor 208 can see traffic and data originating from VMs 202, hypervisor capturing agent 210 can also capture and report any data (e.g., traffic data) associated with VMs 202. For example, hypervisor capturing agent 210 can report every packet or flow of communication sent or received by VMs 202 and/or VM capturing agents 204. Moreover, any communication sent or received by hypervisor 208, including data reported from hypervisor capturing agent 210, can create a network flow. Hypervisor capturing agent 210 can report such flows in the form of a control flow to a remote device, such as collectors 118 illustrated in FIG. 1. Hypervisor capturing agent 210 can report each flow separately and/or in combination with other flows or data. When reporting a flow, hypervisor capturing agent 210 can include a capturing agent identifier that identifies hypervisor capturing agent 210 as reporting the flow. Hypervisor capturing agent 210 can also include in the control flow a flow identifier, an IP address, a timestamp, metadata, a process ID, and any other information, as explained below. In addition, capturing agents 210 can append the process and user information (i.e., which process and/or user is associated with a particular flow) to the control flow. The additional information as identified above can be applied to the control flow as labels. Alternatively, the additional information can be included as part of a header, a trailer, or a payload.

Hypervisor capturing agent 210 can also report multiple flows as a set of flows. When reporting a set of flows, hypervisor capturing agent 210 can include a flow identifier for the set of flows and/or a flow identifier for each flow in the set of flows. Hypervisor capturing agent 210 can also include one or more timestamps and other information as previously explained, such as process and user information.

As previously explained, any communication captured or reported by VM capturing agents 204 can flow through hypervisor 208. Thus, hypervisor capturing agent 210 can observe and capture any flows or packets reported by VM capturing agents 204, including any control flows. Accordingly, hypervisor capturing agent 210 can also report any packets or flows reported by VM capturing agents 204 and any control flows generated by VM capturing agents 204. For example, VM capturing agent $204_A$ on VM 1 ($202_A$) captures flow 1 ("F1") and reports Fl to collector 118 on FIG. 1. Hypervisor capturing agent 210 on hypervisor 208 can also see and capture F 1, as Fl would traverse hypervisor 208 when being sent or received by VM 1 ($202_A$). Accordingly, hypervisor capturing agent 210 on hypervisor 208 can also report Fl to collector 118. Thus, collector 118 can receive a report of F1 from VM capturing agent $204_A$ on VM 1 ($202_A$) and another report of Fl from hypervisor capturing agent 210 on hypervisor 208.

When reporting F1, hypervisor capturing agent 210 can report F1 as a message or report that is separate from the message or report of F1 transmitted by VM capturing agent 204A on VNI 1 ($202_A$). However, hypervisor capturing agent 210 can also, or otherwise, report F1 as a message or report that includes or appends the message or report of F1 transmitted by VM capturing agent $204_A$ on VM 1 ($202_A$). In other words, hypervisor capturing agent 210 can report F1 as a separate message or report from VM capturing agent $204_A$'s message or report of F 1, and/or a same message or report that includes both a report of F1 by hypervisor capturing agent 210 and the report of F1 by VM capturing agent $204_A$ at VM 1 ($202_A$). In this way, VM capturing agents 204 at VMs 202 can report packets or flows received or sent by VMs 202, and hypervisor capturing agent 210 at hypervisor 208 can report packets or flows received or sent by hypervisor 208, including any flows or packets received or sent by VMs 202 and/or reported by VM capturing agents 204.

Hypervisor capturing agent 210 can run as a process, kernel module, or kernel driver on the host operating system associated with hypervisor 208. Hypervisor capturing agent 210 can thus monitor any traffic sent and received by hypervisor 208, any processes associated with hypervisor 208, etc.

Server $106_A$ can also have server capturing agent 214 running on it. Server capturing agent 214 can be a data inspection agent or sensor deployed on server $106_A$ to capture data (e.g., packets, flows, traffic data, etc.) on server $106_A$. Server capturing agent 214 can be configured to export or report any data collected or captured by server capturing agent 214 to a remote entity, such as collector 118, for example. Server capturing agent 214 can communicate or report such data using a network address of server $106_A$, such as an IP address of server 106A.

Server capturing agent 214 can capture and report any packet or flow of communication associated with server $106_A$. For example, capturing agent 216 can report every packet or flow of communication sent or received by one or more communication interfaces of server $106_A$. Moreover, any communication sent or received by server $106_A$, including data reported from capturing agents 204 and 210, can create a network flow associated with server $106_A$. Server capturing agent 214 can report such flows in the form of a control flow to a remote device, such as collector 118 illustrated in FIG. 1. Server capturing agent 214 can report each flow separately or in combination. When reporting a flow, server capturing agent 214 can include a capturing agent identifier that identifies server capturing agent 214 as reporting the associated flow. Server capturing agent 214 can also include in the control flow a flow identifier, an IP address, a timestamp, metadata, a process ID, and any other information. In addition, capturing agent 214 can append the process and user information (i.e., which process and/or user is associated with a particular flow) to the control flow. The additional information as identified above can be applied to the control flow as labels. Alternatively, the additional information can be included as part of a header, a trailer, or a payload.

Server capturing agent 214 can also report multiple flows as a set of flows. When reporting a set of flows, server capturing agent 214 can include a flow identifier for the set of flows and/or a flow identifier for each flow in the set of flows. Server capturing agent 214 can also include one or more timestamps and other information as previously explained.

Any communications captured or reported by capturing agents 204 and 210 can flow through server $106_A$. Thus, server capturing agent 214 can observe or capture any flows or packets reported by capturing agents 204 and 210. In other words, network data observed by capturing agents 204 and 210 inside VMs 202 and hypervisor 208 can be a subset of the data observed by server capturing agent 214 on server $106_A$. Accordingly, server capturing agent 214 can report any packets or flows reported by capturing agents 204 and 210 and any control flows generated by capturing agents 204 and 210. For example, capturing agent $204_A$ on VM 1 ($202_A$) captures flow 1 (F1) and reports Fl to collector 118 as illustrated on FIG. 1. Capturing agent 210 on hypervisor 208 can also observe and capture Fl, as F1 would traverse hypervisor 208 when being sent or received by VM 1 ($202_A$). In addition, capturing agent 214 on server $106_A$ can also see and capture F1, as F1 would traverse server $106_A$ when being sent or received by VM 1 ($202_A$) and hypervisor 208. Accordingly, capturing agent 214 can also report Fl to collector 118. Thus, collector 118 can receive a report (i.e., control flow) regarding Fl from capturing agent $204_A$ on VM 1 ($202_A$), capturing agent 210 on hypervisor 208, and capturing agent 214 on server $106_A$.

When reporting F1, server capturing agent 214 can report F1 as a message or report that is separate from any messages or reports of F1 transmitted by capturing agent 204$_A$ on VM 1 (202$_A$) or capturing agent 210 on hypervisor 208. However, server capturing agent 214 can also, or otherwise, report F1 as a message or report that includes or appends the messages or reports or metadata of F1 transmitted by capturing agent 204$_A$ on VM 1 (202$_A$) and capturing agent 210 on hypervisor 208. In other words, server capturing agent 214 can report F1 as a separate message or report from the messages or reports of F1 from capturing agent 204$_A$ and capturing agent 210, and/or a same message or report that includes a report of F1 by capturing agent 204$_A$, capturing agent 210, and capturing agent 214. In this way, capturing agents 204 at VMs 202 can report packets or flows received or sent by VMs 202, capturing agent 210 at hypervisor 208 can report packets or flows received or sent by hypervisor 208, including any flows or packets received or sent by VMs 202 and reported by capturing agents 204, and capturing agent 214 at server 106$_A$ can report packets or flows received or sent by server 106$_A$, including any flows or packets received or sent by VMs 202 and reported by capturing agents 204, and any flows or packets received or sent by hypervisor 208 and reported by capturing agent 210.

Server capturing agent 214 can run as a process, kernel module, or kernel driver on the host operating system or a hardware component of server 106$_A$. Server capturing agent 214 can thus monitor any traffic sent and received by server 106$_A$, any processes associated with server 106$_A$, etc.

In addition to network data, capturing agents 204, 210, and 214 can capture additional information about the system or environment in which they reside. For example, capturing agents 204, 210, and 214 can capture data or metadata of active or previously active processes of their respective system or environment, operating system user identifiers, metadata of files on their respective system or environment, timestamps, network addressing information, flow identifiers, capturing agent identifiers, etc. Moreover, capturing agents 204, 210, 214 are not specific to any operating system environment, hypervisor environment, network environment, or hardware environment. Thus, capturing agents 204, 210, and 214 can operate in any environment.

As previously explained, capturing agents 204, 210, and 214 can send information about the network traffic they observe. This information can be sent to one or more remote devices, such as one or more servers, collectors, engines, etc. Each capturing agent can be configured to send respective information using a network address, such as an IP address, and any other communication details, such as port number, to one or more destination addresses or locations. Capturing agents 204, 210, and 214 can send metadata about one or more flows, packets, communications, processes, events, etc.

Capturing agents 204, 210, and 214 can periodically report information about each flow or packet they observe. The information reported can contain a list of flows or packets that were active during a period of time (e.g., between the current time and the time at which the last information was reported). The communication channel between the capturing agent and the destination can create a flow in every interval. For example, the communication channel between capturing agent 214 and collector 118 can create a control flow. Thus, the information reported by a capturing agent can also contain information about this control flow. For example, the information reported by capturing agent 214 to collector 118 can include a list of flows or packets that were active at hypervisor 208 during a period of time, as well as information about the communication channel between capturing agent 210 and collector 118 used to report the information by capturing agent 210.

FIG. 2B illustrates a schematic diagram of example capturing agent deployment 220 in an example network device. The network device is described as leaf router 104A, as illustrated in FIG. 1. However, this is for explanation purposes. The network device can be any other network device, such as any other switch, router, etc.

In this example, leaf router 104$_A$ can include network resources 222, such as memory, storage, communication, processing, input, output, and other types of resources. Leaf router 104$_A$ can also include operating system environment 224. The operating system environment 224 can include any operating system, such as a network operating system, embedded operating system, etc. Operating system environment 224 can include processes, functions, and applications for performing networking, routing, switching, forwarding, policy implementation, messaging, monitoring, and other types of operations.

Leaf router 104$_A$ can also include capturing agent 226. Capturing agent 226 can be an agent or sensor configured to capture network data, such as flows or packets, sent received, or processed by leaf router 104$_A$. Capturing agent 226 can also be configured to capture other information, such as processes, statistics, users, alerts, status information, device information, etc. Moreover, capturing agent 226 can be configured to report captured data to a remote device or network, such as collector 118 shown in FIG. 1, for example. Capturing agent 226 can report information using one or more network addresses associated with leaf router 104$_A$ or collector 118. For example, capturing agent 226 can be configured to report information using an IP assigned to an active communications interface on leaf router 104A.

Leaf router 104$_A$ can be configured to route traffic to and from other devices or networks, such as server 106$_A$. Accordingly, capturing agent 226 can also report data reported by other capturing agents on other devices. For example, leaf router 104$_A$ can be configured to route traffic sent and received by server 106$_A$ to other devices. Thus, data reported from capturing agents deployed on server 106$_A$, such as VM and hypervisor capturing agents on server 106$_A$, would also be observed by capturing agent 226 and can thus be reported by capturing agent 226 as data observed at leaf router 104$_A$. Such report can be a control flow generated by capturing agent 226. Data reported by the VM and hypervisor capturing agents on server 106$_A$ can therefore be a subset of the data reported by capturing agent 226.

Capturing agent 226 can run as a process or component (e.g., firmware, module, hardware device, etc.) in leaf router 104$_A$. Moreover, capturing agent 226 can be installed on leaf router 104$_A$ as a software or firmware agent. In some configurations, leaf router 104$_A$ itself can act as capturing agent 226. Moreover, capturing agent 226 can run within operating system 224 and/or separate from operating system 224.

FIG. 2C illustrates a schematic diagram of example reporting system 240 in an example capturing agent topology. Leaf router 104$_A$ can route packets or traffic 242 between fabric 112 and server 106$_A$, hypervisor 108$_A$, and VM 110$_A$. Packets or traffic 242 between VM 110$_A$ and leaf router 104$_A$ can flow through hypervisor 108$_A$ and server 106$_A$. Packets or traffic 242 between hypervisor 108$_A$ and leaf router 104$_A$ can flow through server 106$_A$. Finally, packets or traffic 242 between server 106$_A$ and leaf router 104$_A$ can flow directly to leaf router 104$_A$. However, in some cases, packets or traffic 242 between server 106$_A$ and leaf router $104_A$ can flow through one or more intervening devices or networks, such as a switch or a firewall.

Moreover, VM capturing agent $204_A$ at VM $110_A$, hypervisor capturing agent 210 at hypervisor $108_A$, network device capturing agent 226 at leaf router $104_A$, and any server capturing agent at server $106_A$ (e.g., capturing agent running on host environment of server $106_A$) can send reports 244 (also referred to as control flows) to collector 118 based on the packets or traffic 242 captured at each respective capturing agent. Reports 244 from VM capturing agent $204_A$ to collector 118 can flow through VM $^{110}$A, hypervisor $108_A$, server $106_A$, and leaf router $104_A$. Reports 244 from hypervisor capturing agent 210 to collector 118 can flow through hypervisor $108_A$, server $106_A$, and leaf router $104_A$. Reports 244 from any other server capturing agent at server $106_A$ to collector 118 can flow through server $106_A$ and leaf router $104_A$. Finally, reports 244 from network device capturing agent 226 to collector 118 can flow through leaf router $104_A$. Although reports 244 are depicted as being routed separately from traffic 242 in FIG. 2C, one of ordinary skill in the art will understand that reports 244 and traffic 242 can be transmitted through the same communication channel(s).

Reports 244 can include any portion of packets or traffic 242 captured at the respective capturing agents. Reports 244 can also include other information, such as timestamps, process information, capturing agent identifiers, flow identifiers, flow statistics, notifications, logs, user information, system information, etc. Some or all of this information can be appended to reports 244 as one or more labels, metadata, or as part of the packet(s)' header, trailer, or payload. For example, if a user opens a browser on VM $110_A$ and navigates to examplewebsite.com, VNI capturing agent $204_A$ of VM $110_A$ can determine which user (i.e., operating system user) of VM $110_A$ (e.g., username "johndoe85") and which process being executed on the operating system of VM $110_A$ (e.g., "chrome.exe") were responsible for the particular network flow to and from examplewebsite.com. Once such information is determined, the information can be included in report 244 as labels for example, and report 244 can be transmitted from VM capturing agent $204_A$ to collector 118. Such additional information can help system 240 to gain insight into flow information at the process and user level, for instance. This information can be used for security, optimization, and determining structures and dependencies within system 240. Moreover, reports 244 can be transmitted to collector 118 periodically as new packets or traffic 242 are captured by a capturing agent. Further, each capturing agent can send a single report or multiple reports to collector 118. For example, each of the capturing agents 116 can be configured to send a report to collector 118 for every flow, packet, message, communication, or network data received, transmitted, and/or generated by its respective host (e.g., VM $110_A$, hypervisor $108_A$, server $106_A$, and leaf router $104_A$). As such, collector 118 can receive a report of a same packet from multiple capturing agents.

For example, a packet received by VM $110_A$ from fabric 112 can be captured and reported by VM capturing agent $204_A$. Since the packet received by VM $110_A$ will also flow through leaf router $104_A$ and hypervisor $108_A$, it can also be captured and reported by hypervisor capturing agent 210 and network device capturing agent 226. Thus, for a packet received by VM $110_A$ from fabric 112, collector 118 can receive a report of the packet from VM capturing agent $204_A$, hypervisor capturing agent 210, and network device capturing agent 226.

Similarly, a packet sent by VM $110_A$ to fabric 112 can be captured and reported by VM capturing agent $204_A$. Since the packet sent by VM $110_A$ will also flow through leaf router $104_A$ and hypervisor $108_A$, it can also be captured and reported by hypervisor capturing agent 210 and network device capturing agent 226. Thus, for a packet sent by VM $110_A$ to fabric 112, collector 118 can receive a report of the packet from VM capturing agent $204_A$, hypervisor capturing agent 210, and network device capturing agent 226.

On the other hand, a packet originating at, or destined to, hypervisor $108_A$, can be captured and reported by hypervisor capturing agent 210 and network device capturing agent 226, but not VM capturing agent 204A, as such packet may not flow through VM $110_A$. Moreover, a packet originating at, or destined to, leaf router $104_A$, will be captured and reported by network device capturing agent 226, but not VM capturing agent $204_A$, hypervisor capturing agent 210, or any other capturing agent on server $106_A$, as such packet may not flow through VM $110_A$, hypervisor $108_A$, or server 106A.

Each of the capturing agents $204_A$, 210, 226 can include a respective unique capturing agent identifier on each of reports 244 it sends to collector 118, to allow collector 118 to determine which capturing agent sent the report. Reports 244 can be used to analyze network and/or system data and conditions for troubleshooting, security, visualization, configuration, planning, and management. Capturing agent identifiers in reports 244 can also be used to determine which capturing agents reported what flows. This information can then be used to determine capturing agent placement and topology, as further described below, as well as mapping individual flows to processes and users. Such additional insights gained can be useful for analyzing the data in reports 244, as well as troubleshooting, security, visualization, configuration, planning, and management.

Figure 3A:
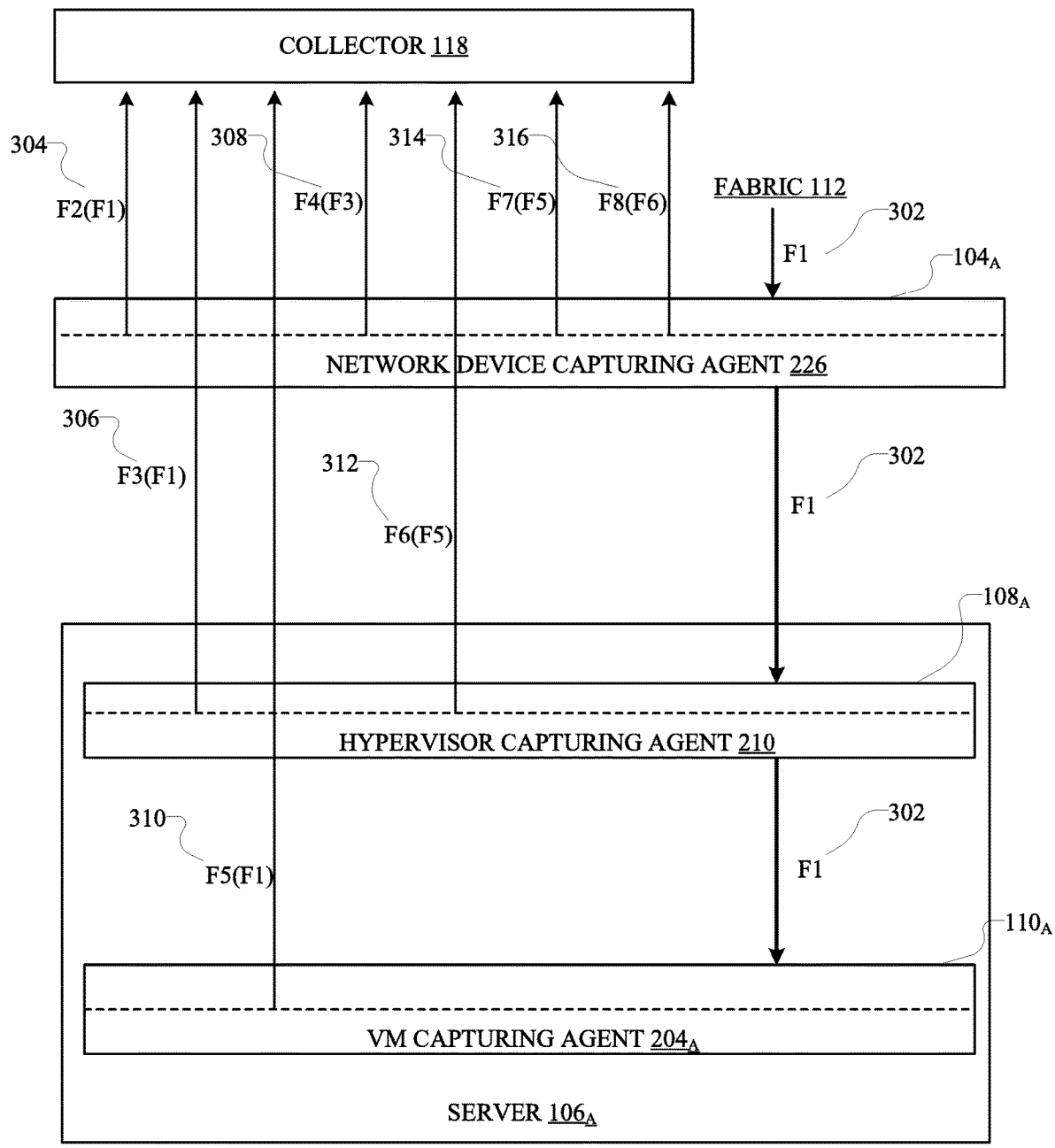

FIGS. 3A-F illustrate schematic diagrams of example configurations for reporting flows captured by capturing agents in an example capturing agent topology. Referring to FIG. 3A, leaf router $104_A$ can receive flow 302 from fabric 112. In this example, flow 302 is destined to VM $110_A$. Leaf router $104_A$ can thus forward flow 302 received from fabric 112 to server $106_A$ and hypervisor $108_A$. Network device capturing agent 226 at leaf router $104_A$ can thus capture flow 302, and send a new control flow 304, reporting the received flow 302, to collector 118. Network device capturing agent 226 may include in control flow 304 any additional information such as process information and user information related to leaf router $104_A$ and flow 302.

Server $106_A$ and hypervisor $108_A$ can receive flow 302 from leaf router $104_A$. Hypervisor 108A can then forward the received flow 302 to VM $110_A$. Hypervisor capturing agent 210 can also capture the received flow 302 and send a new control flow 306, reporting the received flow 302, to collector 118. Hypervisor capturing agent 210 may include in control flow 306 any additional information such as process information and user information related to hypervisor $108_A$ and flow 302. Leaf router $104_A$ can receive control flow 306, reporting flow 302, originating from hypervisor capturing agent 210, and forward flow 306 to collector 118. Network device capturing agent 226 can also capture control flow 306 received from hypervisor capturing agent 210, and send a new control flow 308, reporting flow 306, to collector 118. Again, network device capturing agent 226 may include in control flow 308 any additional information such as process information and user information related to network device $104_A$ and flow 306.

Moreover, VM $110_A$ can receive flow 302 from hypervisor $108_A$. At this point, flow 302 has reached its intended destination: VM $110_A$. Accordingly, VM $110_A$ can then process flow 302. Once flow 302 is received by VM $110_A$, VM capturing agent $204_A$ can capture received flow 302 and send a new control flow 310, reporting the receipt of flow 302, to collector 118. VM capturing agent $204_A$ can include in control flow 310 any additional information such as process information and user information related to VM $110_A$ and flow 302.

Hypervisor $108_A$ can receive control flow 310 from VM capturing agent $204_A$, and forward it to leaf router $104_A$. Hypervisor capturing agent 210 can also capture flow 310, received from VM capturing agent $204_A$ and reporting the receipt of flow 302, and send a new control flow 312, reporting flow 310, to collector 118. Hypervisor capturing agent 210 may include in control flow 312 any additional information such as process information and user information related to hypervisor $108_A$ and flow 310.

Leaf router $104_A$ can receive flow 310 forwarded from hypervisor $108_A$, and forward it to collector 118. Network device capturing agent 226 can also capture flow 310, forwarded from hypervisor capturing agent 210 and reporting the receipt of flow 302 at VM $110_A$, and send a new control flow 314, reporting flow 310, to collector 118. Network device capturing agent 226 may include in control flow 314 any additional information such as process information and user information related to network device $104_A$ and flow 310.

Leaf router $104_A$ can receive packet 312 from hypervisor capturing agent 210 and forward it to collector 118. Network device capturing agent 226 can also capture flow 312 and send a new control flow 316, reporting flow 312, to collector 118. Network device capturing agent 226 may include in control flow 316 any additional information such as process information and user information related to network device $104_A$ and flow 312.

As described above, in this example, flow 302 destined from fabric 112 to VM $110_A$, can be reported by network device capturing agent 226, hypervisor capturing agent 210, and VM capturing agent $204_A$ to collector 118. In addition, hypervisor capturing agent 210 and network device capturing agent 226 can each report the communication from VM $110_A$ to collector 118, reporting flow 302 to collector 118. Moreover, network device capturing agent 226 can report any communications from hypervisor capturing agent 210 reporting flows or communications captured by hypervisor capturing agent 210. As one of skill in the art will understand, the order in which control flows 304, 306, 308, 310, 312, 314, 316 are reported to collector 118 need not occur in the same order that is presented in this disclosure as long as each control flow is transmitted or forwarded to another device after the flow which the control flow is reporting is received. For example, control flow 314, which reports flow 310, may be transmitted to collector 118 either before or after each of control flows 308, 312, 316 is transmitted or forwarded to collector 118 as long as control flow 314 is transmitted sometime after flow 310 is received at leaf router $104_A$. This applies to other control flows illustrated throughout disclosure especially those shown in FIGS. 3A-3F. In addition, other capturing agents such as a server capturing agent (not shown) for $106_A$ may also capture and report any traffic or flows that server $106_A$ may send, receive, or otherwise process.

Referring to FIG. 3B, leaf router $104_A$ can receive flow 324 from fabric 112. In this example, flow 324 is destined for hypervisor $108_A$. Leaf router $104_A$ can thus forward the flow 324 received from fabric 112 to server $106_A$ and hypervisor 108A. network device capturing agent 226 at leaf router $104_A$ can also capture the flow 324, and send a new control flow 318, reporting the received flow 324, to collector 118. Network device capturing agent 226 may include in control flow 318 any additional information such as process information and user information related to network device $104_A$ and flow 324.

Server $106_A$ and hypervisor $108_A$ can receive flow 324 from leaf router $104_A$. Hypervisor $108_A$ can process received flow 324. Hypervisor capturing agent 210 can also capture received flow 324 and send a new control flow 320, reporting received flow 324, to collector 118. Hypervisor capturing agent 210 may include in control flow 320 any additional information such as process information and user information related to hypervisor $108_A$ and flow 324. Leaf router $104_A$ can receive flow 320, reporting flow 324, from hypervisor capturing agent 210, and forward control flow 320 to collector 118. Network device capturing agent 226 can also capture flow 320 received from hypervisor capturing agent 210, and send a new control flow 322, reporting flow 320, to collector 118. Network device capturing agent 226 may include in control flow 322 any additional information such as process information and user information related to network device $104_A$ and flow 320.

As described above, in this example, flow 324 destined from fabric 112 to hypervisor $108_A$, can be reported by network device capturing agent 226 and hypervisor capturing agent 210 to collector 118. In addition, network device capturing agent 226 can report the communication from hypervisor $108_A$ to collector 118, reporting flow 324 to collector 118.

Figure 3C:
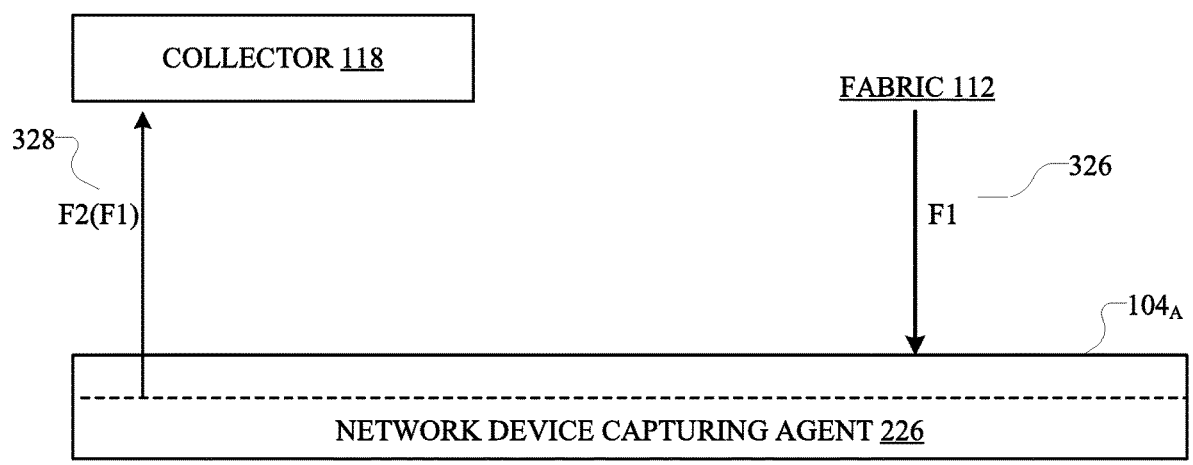

Referring to FIG. 3C, leaf router $104_A$ can receive flow 326 from fabric 112. In this example, flow 326 is destined for leaf router $104_A$. Thus, leaf router $104_A$ can process flow 326, and network device capturing agent 226 can capture flow 326, and send a new control flow 328, reporting the received flow 326, to collector 118. Network device capturing agent 226 may include in control flow 328 any additional information such as process information and user information related to network device $104_A$ and flow 326.

Figure 3D:
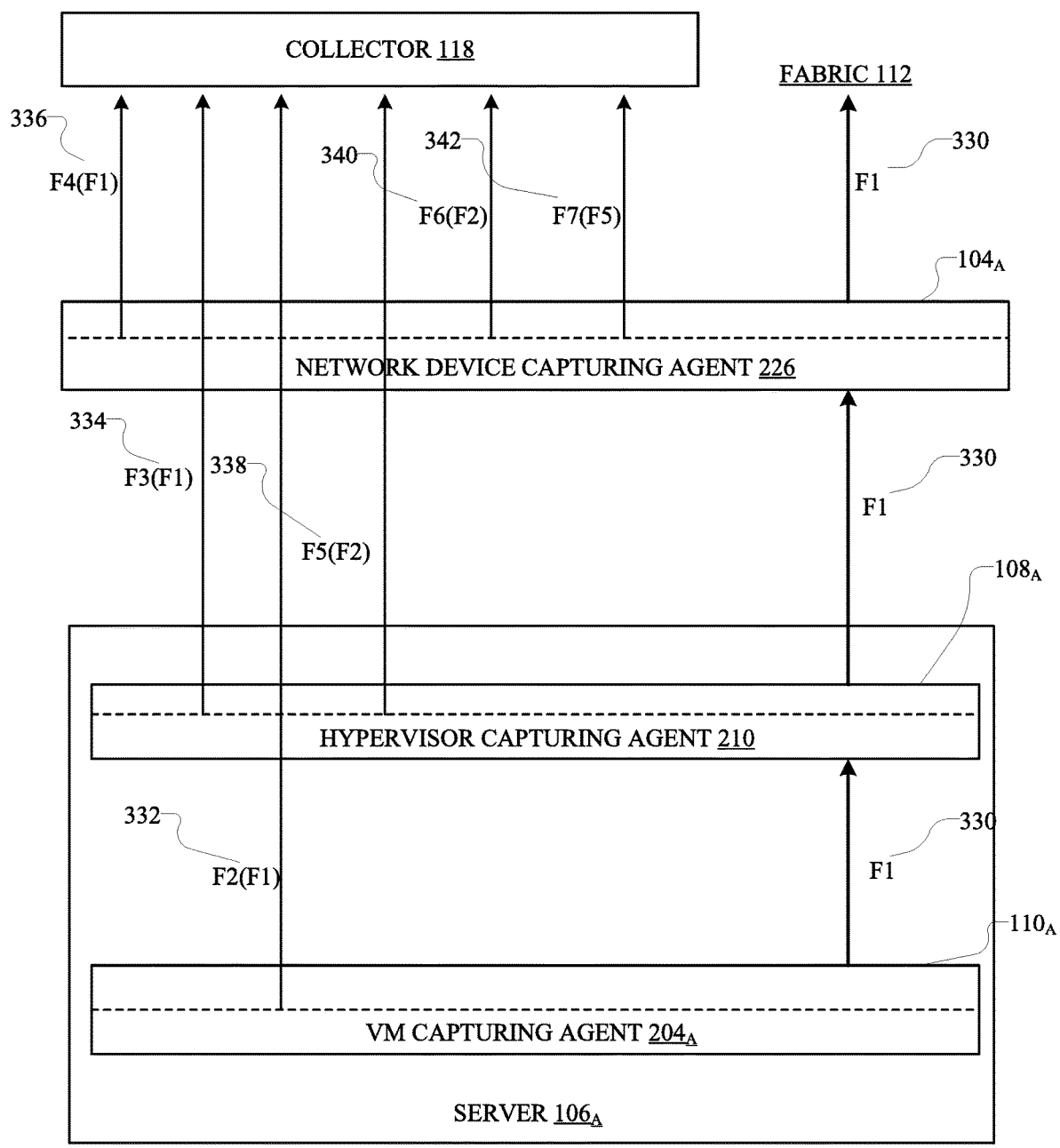

Referring to FIG. 3D, VM $110_A$ can send flow 330 to fabric 112. Hypervisor $108_A$ can receive flow 330 and forward it to leaf router $104_A$. Leaf router $104_A$ can receive flow 330 and forward it to fabric 112.

VM capturing agent $204_A$ can also capture flow 330 and send a new control flow 332, reporting flow 330, to collector 118. VM capturing agent $204_A$ may include in control flow 332 any additional information such as process information and user information related to VM $110_A$ and flow 330. Hypervisor capturing agent 210 can also capture flow 330 and send a new control flow 334, reporting flow 330, to collector 118. Hypervisor capturing agent 210 may include in control flow 334 any additional information such as process information and user information related to hypervisor $108_A$ and flow 330. Similarly, network device capturing agent 226 can capture flow 330, and send a new control flow 336, reporting flow 330, to collector 118. Network device capturing agent 226 may include in control flow 336 any additional information such as process information and user information related to network device $104_A$ and flow 330.

Hypervisor capturing agent 210 can also capture flow 332, reporting flow 330 by VM capturing agent $204_A$, and send a new control flow 338, reporting flow 332, to collector 118. Hypervisor capturing agent 210 may include in control flow 338 any additional information such as process information and user information related to hypervisor $108_A$ and flow 332.

Network device capturing agent 226 can similarly capture flow 332, reporting flow 330 by VM capturing agent $204_A$, and send a new control flow 340, reporting flow 332, to collector 118. Network device capturing agent 226 may include in control flow 340 any additional information such as process information and user information related to network device $104_A$ and flow 332. Moreover, network device capturing agent 226 can capture flow 338, reporting flow 332 from hypervisor capturing agent 210, and send a new control flow 342, reporting flow 338, to collector 118. Network device capturing agent 226 may include in control flow 342 any additional information such as process information and user information related to network device $104_A$ and flow 338.

As described above, in this example, flow 330 destined to fabric 112 from VM $110_A$, can be reported by network device capturing agent 226, hypervisor capturing agent 210, and VM capturing agent $204_A$ to collector 118. In addition, hypervisor capturing agent 210 and network device capturing agent 226 can each report the communication (i.e., control flow) from VIVI $110_A$ to collector 118, reporting flow 330 to collector 118. Network device capturing agent 226 can also report any communications from hypervisor capturing agent 210 reporting flows or communications captured by hypervisor capturing agent 210.

Figure 3E:
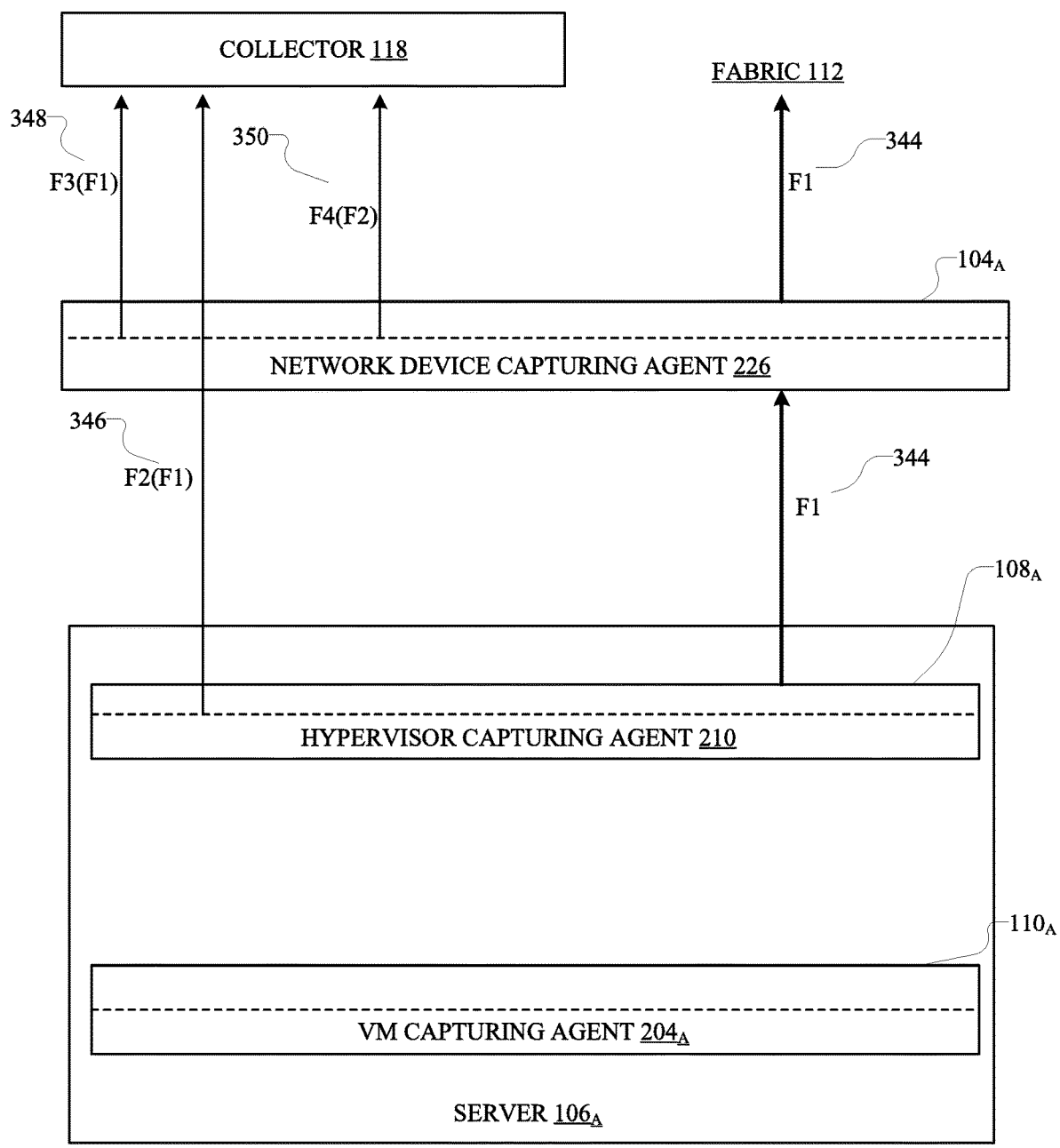

Referring to FIG. 3E, hypervisor $108_A$ can send flow 344 to fabric 112. In this example, flow 344 is originated by hypervisor $108_A$. Leaf router $104_A$ can receive flow 344 and forward it to fabric 112.

Hypervisor capturing agent 210 can also capture flow 344 and send a new control flow 346, reporting flow 344, to collector 118. Hypervisor capturing agent 210 may include in control flow 346 any additional information such as process information and user information related to hypervisor $108_A$ and flow 344. Similarly, network device capturing agent 226 can capture flow 344, and send a new control flow 348, reporting flow 344, to collector 118. Again, network device capturing agent 226 may include in control flow 348 any additional information such as process information and user information related to network device $104_A$ and flow 344.

Network device capturing agent 226 can also capture flow 346, reporting flow 344 by hypervisor capturing agent 210, and send a new control flow 350, reporting flow 346, to collector 118. Network device capturing agent 226 may include in control flow 350 any additional information such as process information and user information related to network device $104_A$ and flow 346.

Figure 3F:
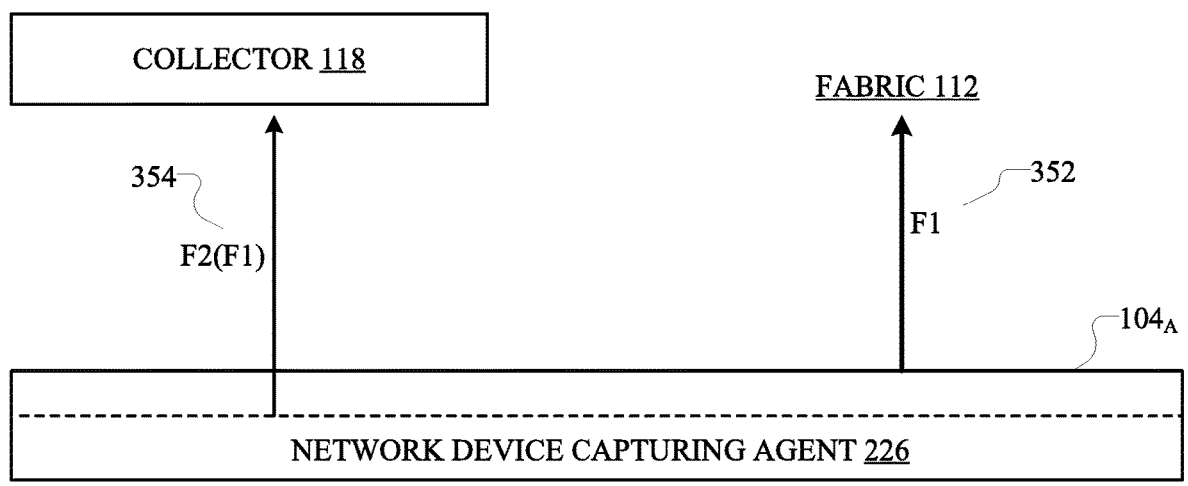

Referring to FIG. 3F, leaf router $104_A$ can send flow 352 to fabric 112. In this example, flow 352 is originated by leaf router $104_A$. Network device capturing agent 226 can capture flow 352, and send a new control flow 354, reporting flow 352, to collector 118. In addition, network device capturing agent 226 may include in control flow 354 any additional information such as process information and user information related to network device $104_A$ and flow 352. Thus, collector 118 can receive a report of flow 352 from network device capturing agent 226.

Figure 4:
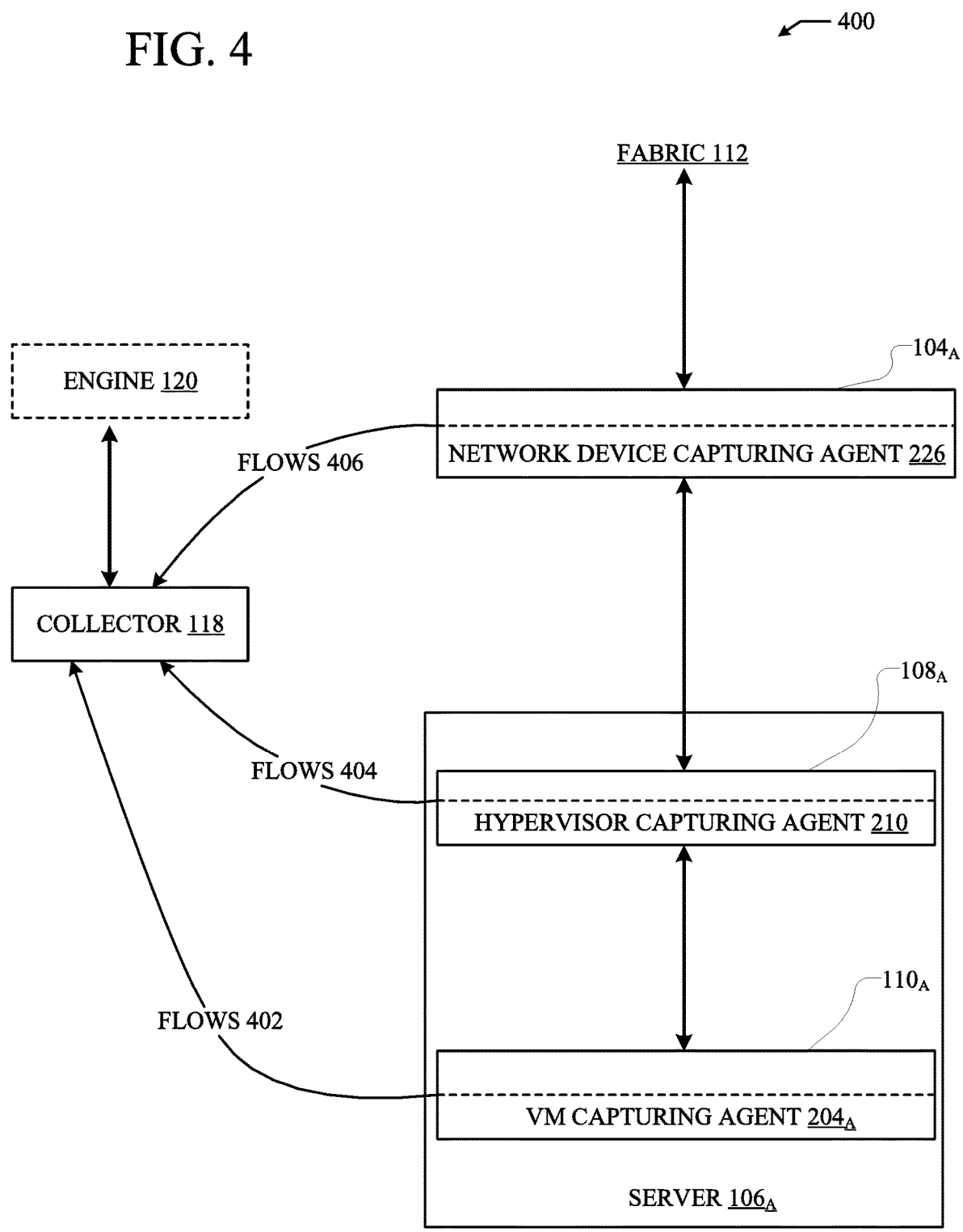
FIG. 4 illustrates a schematic diagram of an example configuration for collecting capturing agent reports.

FIG. 4 illustrates a schematic diagram of an example configuration 400 for collecting capturing agent reports (i.e., control flows). In configuration 400, traffic between fabric 112 and VM $110_A$ is configured to flow through hypervisor 108A. Moreover, traffic between fabric 112 and hypervisor $108_A$ is configured to flow through leaf router $104_A$.

VM capturing agent $204_A$ can be configured to report to collector 118 traffic sent, received, or processed by VM $110_A$. Hypervisor capturing agent 210 can be configured to report to collector 118 traffic sent, received, or processed by hypervisor $108_A$. Finally, network device capturing agent 226 can be configured to report to collector 118 traffic sent, received, or processed by leaf router $104_A$.

Collector 118 can thus receive flows 402 from VM capturing agent $204_A$, flows 404 from hypervisor capturing agent 210, and flows 406 from network device capturing agent 226. Flows 402, 404, and 406 can include control flows. Flows 402 can include flows captured by VM capturing agent $204_A$ at VM $110_A$.

Flows 404 can include flows captured by hypervisor capturing agent 210 at hypervisor $108_A$. Flows captured by hypervisor capturing agent 210 can also include flows 402 captured by VM capturing agent $204_A$, as traffic sent and received by VM $110_A$ will be received and observed by hypervisor $108_A$ and captured by hypervisor capturing agent 210.

Flows 406 can include flows captured by network device capturing agent 226 at leaf router $104_A$. Flows captured by network device capturing agent 226 can also include flows 402 captured by VM capturing agent $204_A$ and flows 404 captured by hypervisor capturing agent 210, as traffic sent and received by VM $110_A$ and hypervisor $108_A$ is routed through leaf router $104_A$ and can thus be captured by network device capturing agent 226.

Collector 118 can collect flows 402, 404, and 406, and store the reported data. Collector 118 can also forward some or all of flows 402, 404, and 406, and/or any respective portion thereof, to engine 120. Engine 120 can process the information, including any process information and user information, received from collector 118 to identify patterns, conditions, statuses, network or device characteristics; log statistics or history details; aggregate and/or process the data; generate reports, timelines, alerts, graphical user interfaces; detect errors, events, inconsistencies; troubleshoot networks or devices; configure networks or devices; deploy services or devices; reconfigure services, applications, devices, or networks; etc. In particular, collector 118 or engine 120 can map individual flows that traverse VM $110_A$, hypervisor $108_A$, and/or leaf router $104_A$ to specific processes or users that are associated with VM $110_A$, hypervisor $108_A$, and/or leaf router $104_A$. For example, collector 118 or engine 120 can determine that a particular flow that originated from VM $110_A$ and destined for fabric 112 was sent by an OS user named X on VM $110_A$ and via a process named Y on VM $110_A$. It may be determined that the same flow was received by a process named Z on hypervisor 108A and forwarded to a process named W on leaf router $104_A$.

While engine 120 is illustrated as a separate entity, other configurations are also contemplated herein. For example, engine 120 can be part of collector 118 and/or a separate entity. Indeed, engine 120 can include one or more devices, applications, modules, databases, processing components, elements, etc. Moreover, collector 118 can represent one or more collectors. For example, in some configurations, collector 118 can include multiple collection systems or entities, which can reside in one or more networks.

Figure 5:
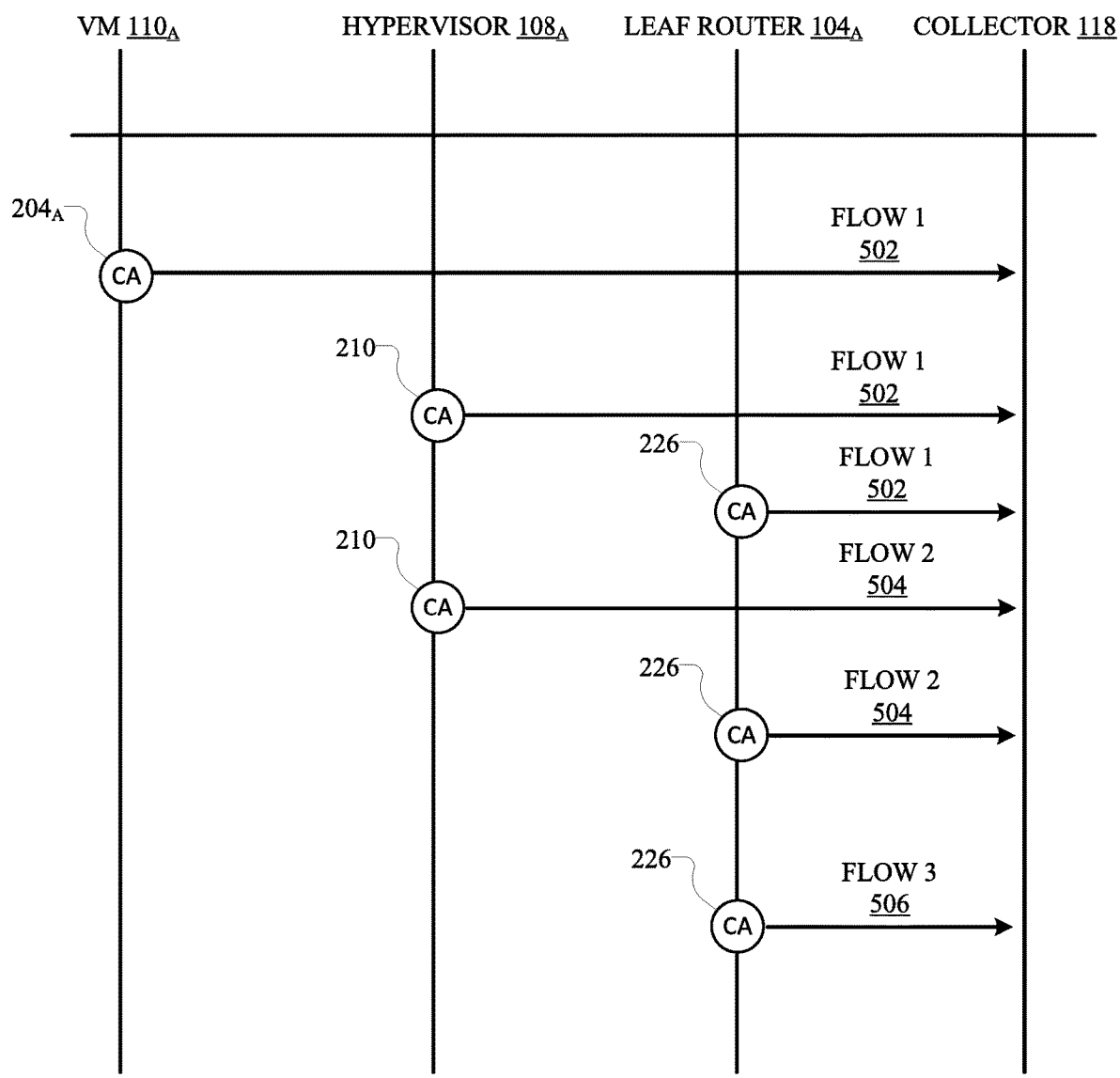
FIG. 5 illustrates a diagram of an example capturing agent reporting process.

FIG. 5 illustrates a sequence diagram of example capturing agent reporting process 500. In this example, flow 1 (502) has been observed (e.g., received, sent, generated, processed) by VIVI 11 $O_A$, hypervisor $108_A$, and leaf router $104_A$. Flow 2 (504) has been observed by hypervisor $108_A$ and leaf router $104_A$. Flow 3 (506) has only been observed by leaf router $104_A$.

Since flow 1 (502) has been observed by VM 110$_A$, hypervisor 108$_A$, and leaf router 104$_A$, it can be captured and reported to collector 118 by VM capturing agent 204$_A$ at VM 110$_A$, hypervisor capturing agent 210 at hypervisor 108$_A$, and network device capturing agent 226 at leaf router 104$_A$. On the other hand, since flow 2 (504) has been observed by hypervisor 108$_A$ and leaf router 104$_A$ but not by VM 110$_A$, it can be captured and reported to collector 118 by hypervisor capturing agent 210 at hypervisor 108$_A$ and network device capturing agent 226 at leaf router 104$_A$, but not by VM capturing agent 204$_A$ at VM 110$_A$ Finally, since flow 3 (506) has only been observed by leaf router 104$_A$, it can be captured and reported to collector 118 only by capturing agent 226 at leaf router 104$_A$.

The reports or control flows received by collector 118 can include information identifying the reporting capturing agent. For example, when transmitting a report to collector 118, each capturing agent can include a unique capturing agent identifier, which the collector 118 and/or any other entity reviewing the reports can use to map a received report with the reporting capturing agent. Furthermore, the reports or control flows received by collector 118 can include information identifying the process or the user responsible for the flow being reported. Collector 118 can use such information to map the flows to corresponding processes or users.

Thus, based on the reports from capturing agents 204$_A$, 210, and 226, collector 118 and/or a separate entity (e.g., engine 120) can determine that flow 1 (502) was observed and reported by capturing agent 204A at VM 110$_A$, capturing agent 210 at hypervisor 108$_A$, and capturing agent 226 at leaf router 104$_A$; flow 2 (504) was observed and reported by capturing agent 210 at hypervisor 108$_A$ and capturing agent 226 at leaf router 104$_A$; and flow 3 (506) was only observed and reported by capturing agent 226 at leaf router 104$_A$. Based on this information, collector 118 and/or a separate entity, can determine the placement of capturing agents 204$_A$, 210, 226 within VM 110$_A$, hypervisor 108$_A$, and leaf router 104$_A$, as further described below. In other words, this information can allow a device, such as collector 118, to determine which of capturing agents 204$_A$, 210, 226 is located at VM 110$_A$, which is located at hypervisor 108$_A$, and which is located at leaf router 104$_A$. If any of VM 110$_A$, hypervisor 108$_A$, and leaf router 104$_A$ is moved to a different location (e.g., VM 110$_A$ moved to server 106$_C$ and hypervisor 108$_B$), the new flows collected by collector 118 can be used to detect the new placement and topology of VM 110$_A$, hypervisor 108$_A$, and leaf router 104$_A$ and/or their respective capturing agents. Furthermore, the process and/or user information included in the control flows received at collector 118 may also assist in determining how VM 110A, hypervisor 108$_A$, and/or leaf router 104$_A$ may move to a different location within the network. For example, by recognizing that a new device that just appeared in the network is sending out a flow that matches the process and/or user profiles of a previously known device, such as VM 110$_A$, collector 118 can determine that the new device is actually VM 110$_A$ that just moved to a different location (e.g., from server 1 (106$_A$) to server 4 (106$_D$)) within the network topology.

FIG. 6 illustrates a table of example mapping 600 of flow reports to capturing agents. In this example, flow 602 was sent/received by VM 110$_A$, flow 604 was sent/received by hypervisor 108$_A$, and flow 606 was sent/received by leaf router 104$_A$. Accordingly, flow 602 was reported by VM capturing agent 204$_A$, hypervisor capturing agent 210, and network device capturing agent 226. Flow 604 was reported by hypervisor capturing agent 210 and network device capturing agent 226, but not by VM capturing agent 204$_A$. Finally flow 606 was reported by network device capturing agent 226, but not VM capturing agent 204$_A$ or hypervisor capturing agent 210.

Figure 7:
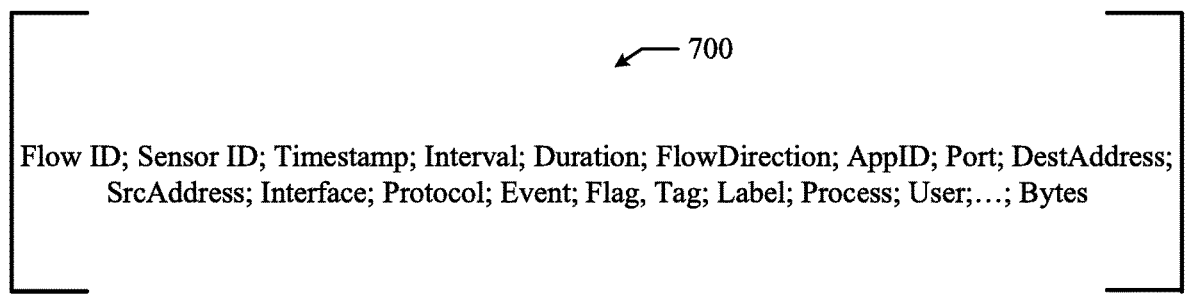
FIG. 7 illustrates a listing of example fields on a capturing agent report.

FIG. 7 illustrates listing 700 of example fields on a capturing agent report or control flow. The listing 700 can include one or more fields, such as:

Flow identifier (e.g., unique identifier associated with the flow).

Capturing agent identifier (e.g., data uniquely identifying reporting capturing agent).

Timestamp (e.g., time of event, report, etc.).

Interval (e.g., time between current report and previous report, interval between flows or packets, interval between events, etc.).

Duration (e.g., duration of event, duration of communication, duration of flow, duration of report, etc.).

Flow direction (e.g., egress flow, ingress flow, etc.).

Application identifier (e.g., identifier of application associated with flow, process, event, or data).

Port (e.g., source port, destination port, layer 4 port, etc.).

Destination address (e.g., interface address associated with destination, IP address, domain name, network address, hardware address, virtual address, physical address, etc.).

Source address (e.g., interface address associated with source, IP address, domain name, network address, hardware address, virtual address, physical address, etc.).

Interface (e.g., interface address, interface information, etc.).

Protocol (e.g., layer 4 protocol, layer 3 protocol, etc.).

Event (e.g., description of event, event identifier, etc.).

Flag (e.g., layer 3 flag, flag options, etc.).

Tag (e.g., virtual local area network tag, etc.).

Process (e.g., process identifier, etc.).

User (e.g., OS username, etc.).

Bytes (e.g., flow size, packet size, transmission size, etc.).

The listing 700 includes a non-limiting example of fields in a report. Other fields and data items are also contemplated herein, such as handshake information, system information, network address associated with capturing agent or host, operating system environment information, network data or statistics, process statistics, system statistics, etc. The order in which these fields are illustrated is also exemplary and can be rearranged in any other way. One or more of these fields can be part of a header, a trailer, or a payload of in one or more packets. Moreover, one or more of these fields can be applied to the one or more packets as labels. Each of the fields can include data, metadata, and/or any other information relevant to the fields.

Figure 8:
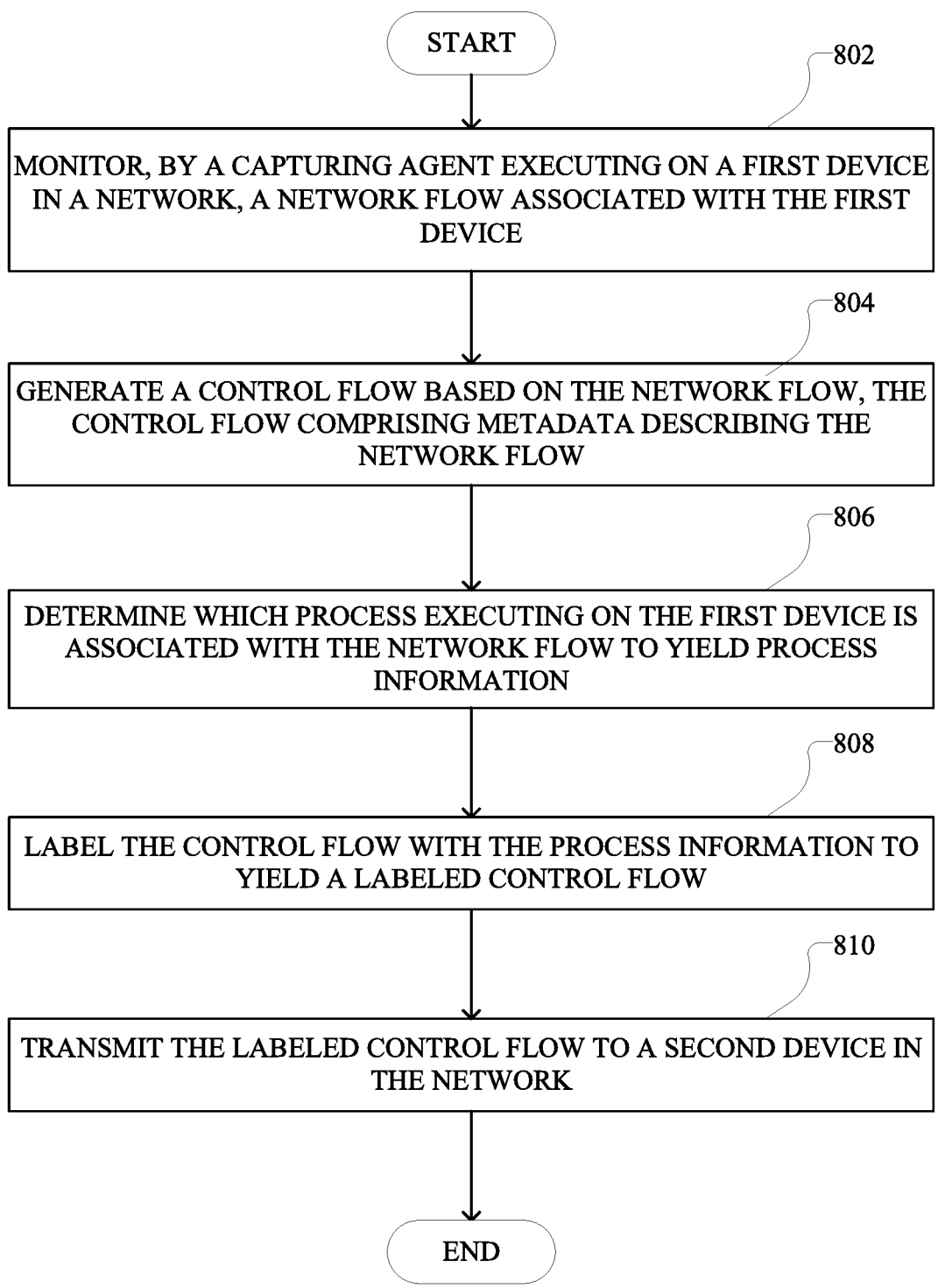
FIG. 8 illustrates an example method embodiment related to process information.

Having disclosed some basic system components and concepts, the disclosure now turns to the exemplary method embodiments shown in FIGS. 8-9. For the sake of clarity, the methods are described in terms of capturing agent 116, as shown in FIG. 1, configured to practice the method. However, the example methods can be practiced by any software or hardware components, devices, etc. heretofore disclosed. The steps outlined herein are exemplary and can be implemented in any combination thereof in any order, including combinations that exclude, add, or modify certain steps.

In FIG. 8, capturing agent 116, executing on a first device in a network, can monitor a network flow associated with the first device (802). The first device can be a VM, a hypervisor, a server, a network device, etc. Capturing agent 116 can be a process, a cluster of processes, a kernel module, or a kernel driver. In addition, capturing agent 116 can run on a guest operating system installed in a virtual machine on the device. Capturing agent 116 may also run on a host operating system installed at a hypervisor layer or on a hypervisor. Moreover, capturing agent 116 can be a process or a component in a network device such as a switch. The network flow or stream can be one or more data packets.

At step 804, capturing agent 116 can generate a control flow based on the network flow. The control flow can include metadata describing the network flow. The metadata can relate to network data, an active process of the system, a previously active process of the device, and/or a file that is present on the device. The metadata can also relate to operating system user identifiers, timestamps, network addressing information, flow identifiers, capturing agent identifiers, time interval, interval duration, flow direction, application identifier, port, destination address, source address, interface, protocol, event, flag, tag, user, size, handshake information, statistics, etc. with regards to the network flow being monitored and reported.

At step 806, capturing agent 116 can determine which process executing on the first device is associated with the network flow to yield process information. The process information may include the process identifier of the process. Furthermore, the process information may include information about the OS username associated with the process. The identified process may be responsible for sending, receiving, or otherwise processing the network flow. The process can belong to the operating system environment of the first device. Capturing agent 116 can further determine which OS user of the first device is associated with the network flow to yield user information.

The capturing agent 116 can determine which kernel module has been loaded and/or query the operating system to determine which process is executing on the first device. The capturing agent 116 can also determine process ownership information to identify which user has executed a particular service or process.

At step 808, capturing agent 116 can label the control flow with the process information to yield a labeled control flow. Capturing agent 116 can further label the control flow with user information. The process and/or user information can be applied or added to the control flow as part of a header, a trailer, or a payload.

At step 810, capturing agent can transmit the labeled control flow to a second device in the network. The second device can be a collector that is configured to receive a plurality of control flows from a plurality of devices, particularly from their capturing agents, and analyze the plurality of control flows to determine relationships between network flows and corresponding processes. Those other devices can also be VMs, hypervisors, servers, network devices, etc. equipped with VM capturing agents, hypervisor capturing agents, server capturing agents, network device capturing agents, etc. The second device can map the relationships between the network flows and the corresponding processes within the first device and other devices in the plurality of devices. The second device or another device can utilize this information to identify patterns, conditions, statuses, network or device characteristics; log statistics or history details; aggregate and/or process the data; generate reports, timelines, alerts, graphical user interfaces; detect errors, events, inconsistencies; troubleshoot networks or devices; configure networks or devices; deploy services or devices; reconfigure services, applications, devices, or networks; etc.

In FIG. 9, capturing agent 116, executing on a first device in a network, can monitor a network flow associated with the first device (902). The first device can be a VM, a hypervisor, a server, a network device, etc. Capturing agent 116 can be a process, a cluster of processes, a kernel module, or a kernel driver. In addition, capturing agent 116 can run on a guest operating system installed in a virtual machine on the device. Capturing agent 116 may also run on a host operating system installed at a hypervisor layer or on a hypervisor. Moreover, capturing agent 116 can be a process or a component in a network device such as a switch. The network flow or stream can be one or more data packets.

At step 904, capturing agent 116 can generate a control flow based on the network flow. The control flow can include metadata describing the network flow. The metadata can relate to network data, an active process of the system, a previously active process of the device, and/or a file that is present on the device. The metadata can also relate to processes, timestamps, network addressing information, flow identifiers, capturing agent identifiers, time interval, interval duration, flow direction, application identifier, port, destination address, source address, interface, protocol, event, flag, tag, size, handshake information, statistics, etc. with regards to the network flow being monitored and reported.

At step 906, capturing agent 116 can determine which user of the first device is associated with the network flow to yield user information. The user can be an operating system user account. The user information may include the username or the user identifier associated with the user. The user may be an OS user of the first device's OS environment. The user may be associated with a process that sends, receives, or otherwise processes the network flow. Capturing agent 116 can further determine which process executing on the first device is associated with the network flow to yield process Information.

At step 908, capturing agent 116 can label the control flow with the user information to yield a labeled control flow. Capturing agent 116 can further label the control flow with process information. The process and/or user information can be applied or added to the control flow as part of a header, a trailer, or a payload.

At step 910, capturing agent can transmit the labeled control flow to a second device in the network. The second device can be a collector that is configured to receive a plurality of control flows from a plurality of devices, particularly from their capturing agents, and analyze the plurality of control flows to determine relationships between network flows and corresponding processes. Those other devices can also be VMs, hypervisors, servers, network devices, etc. equipped with VM capturing agents, hypervisor capturing agents, server capturing agents, network device capturing agents, etc. The second device can map the relationships between the network flows and the corresponding users associated with the first device or another device in the plurality of devices. The second device or some other device can utilize this information to identify patterns, conditions, statuses, network or device characteristics; log statistics or history details; aggregate and/or process the data; generate reports, timelines, alerts, graphical user interfaces; detect errors, events, inconsistencies; troubleshoot networks or devices; configure networks or devices; deploy services or devices; reconfigure services, applications, devices, or networks; etc.

Example Devices

FIG. 10 illustrates an example network device 1010 according to some embodiments. Network device 1010 includes a master central processing unit (CPU) 1062, interfaces 1068, and a bus 1015 (e.g., a PCI bus). When acting under the control of appropriate software or firmware, the CPU 1062 is responsible for executing packet management, error detection, and/or routing functions. The CPU 1062 preferably accomplishes all these functions under the control of software including an operating system and any appropriate applications software. CPU 1062 may include one or more processors 1063 such as a processor from the Motorola family of microprocessors or the MIPS family of microprocessors. In an alternative embodiment, processor 1063 is specially designed hardware for controlling the operations of router 1010. In a specific embodiment, a memory 1061 (such as non-volatile RANI and/or ROM) also forms part of CPU 1062. However, there are many different ways in which memory could be coupled to the system.

The interfaces 1068 are typically provided as interface cards (sometimes referred to as "line cards"). Generally, they control the sending and receiving of data packets over the network and sometimes support other peripherals used with the router 1010. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, etc.

Although the system shown in FIG. 10 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1061) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 11A and FIG. 11B illustrate example system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates an example computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output device 1165, such as a display, and can read and write information to storage device 1170, which can include magnetic media, and solid state media, for example. Chipset 1160 can also read data from and write data to RANI 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs. Moreover, claim language reciting "at least one of a set indicates that one member of the set or multiple members of the set satisfy the claim.

Figure 12:
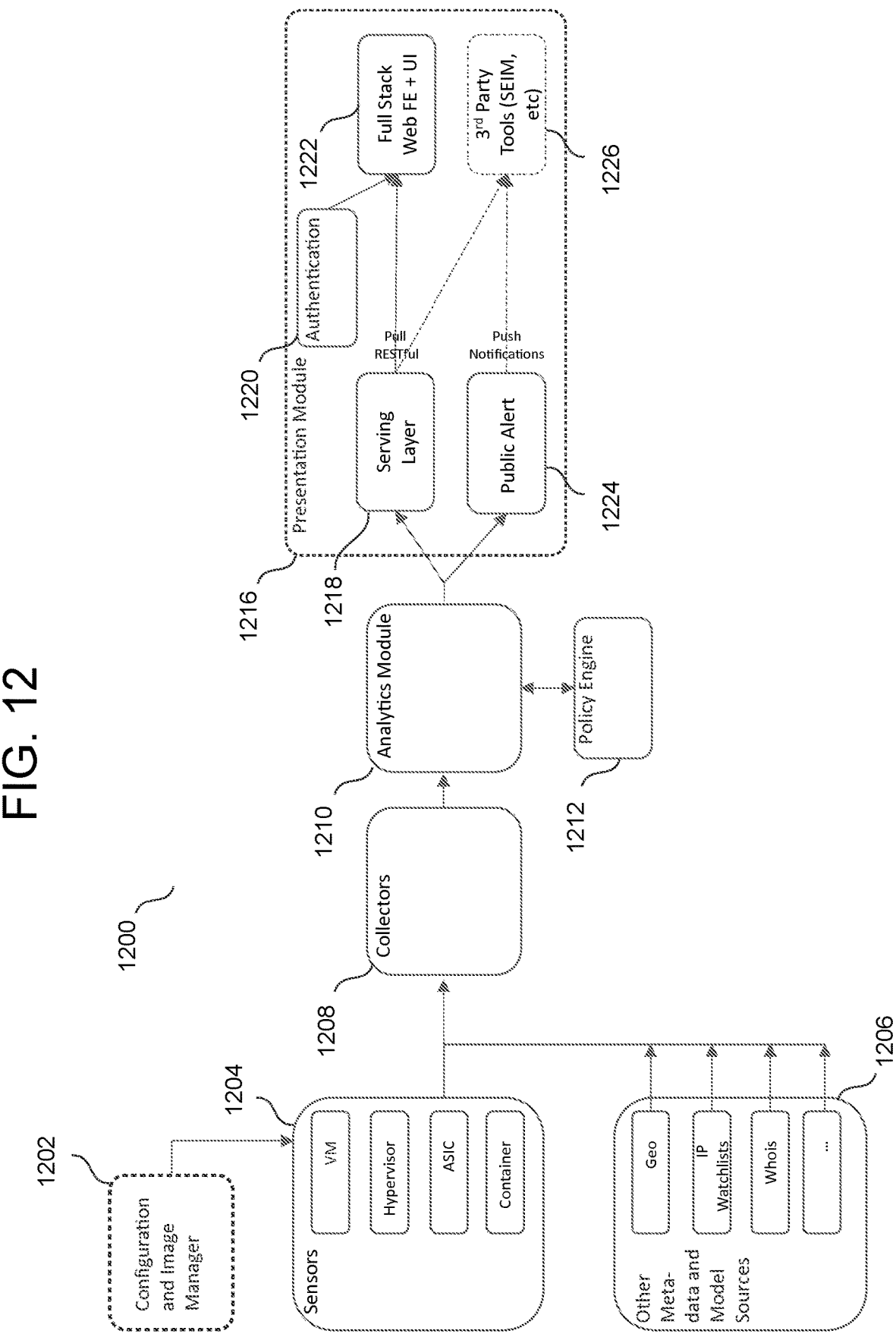
FIG. 12 depicts a traffic monitoring system.

FIG. 12 depicts traffic monitoring system 1200. This traffic monitoring system 1200 can comprise sensors 1204, collectors 1208, an analytics module 1220, and a presentation module 1226.

Configuration and image manager 1202 can provision and maintain sensors 1204. Because many sensors 1204 reside within virtual machine images, configuration and image manager 1202 can be the component that also provisions virtual machine images.

Sensors 1204 can reside on every node and component of the data center (e.g., virtual machine, hypervisor, slice, blade, switch, router, gateway, etc.). Sensors 1204 can monitor traffic to and from the component, report on environmental data related to the component (e.g., component IDs, statuses, etc.), and perform actions related to the component (e.g., shut down a process, block ports, redirect traffic, etc.). Sensors 1202 can send their records over a high-speed connection to the collectors 1208 for storage. As mentioned previously, sensors 1204 can comprise a piece of software (e.g., running on a virtual machine, container, or hypervisor), an ASIC (e.g., a component of a switch, gateway, router, or standalone packet monitor), or an independent unit (e.g., a device connected to a switch's monitoring port or a device connected in series along a main trunk of a datacenter). For clarity and simplicity in this description, the term "component" is used to denote a component of the network (i.e., a process, module, slice, blade, hypervisor, machine, switch, router, gateway, etc.). It should be understood that various software and hardware configurations can be used as sensors 1204. Sensors 1204 can be lightweight, minimally impeding normal traffic and compute resources in a datacenter. Software sensors 1204 can "sniff" packets being sent over its host network interface card (NIC) or individual processes can be configured to report traffic to sensors 1204. In some embodiments, sensors 1204 are on every virtual machine, hypervisor, switch, etc. This layered sensor structure allows for granular packet statistics and data at each hop of data transmission. In some embodiments, sensors 1204 are prevented from being installed in certain places. For example, in a shared hosting environment, customers may have exclusive control of VMs, thus preventing network administrators from installing a sensor on those VMs.

As sensors 1204 capture traffic flows, they can continuously send reports to collectors 1208. The reports can relate to a packet, collection of packets, flow, group of flows, open ports, port knocks, etc. The reports can also include other details such as the VM bios ID, sensor ID, associated process ID, associated process name, process user name, sensor private key, geo-location of sensor, environmental details, etc. The reports can comprise data describing the connection information on all layers of the OSI model. For example, the reports can include Ethernet signal strength, destination MAC address, IP address, protocol, port number, encryption data, requesting process, etc.

Sensors 1204 can preprocess reports before sending. For example, sensors 1204 can remove extraneous or duplicative data or they can create a Summary of the data (e.g., latency, packets and bytes sent per traffic flow, flagging abnormal activity, etc.). In some embodiments, sensors 1204 are configured to only capture certain types of connection information and they disregard the rest. Because it can be overwhelming for a system to capture every packet, sensors can be configured to capture only a representative sample of packets (for example, every 12,000th packet).

Sensors 1204 can perform actions. For example, a sensor installed on a VM can close, quarantine, restart, or throttle a process. Sensors 1204 can create and enforce firewall policies (e.g., block access to ports, protocols, or addresses). In some embodiments, sensors 1204 receive instructions to perform such actions; alternatively, sensors 1204 can act independently and without external direction.

Sensors 1204 can send reports to one or multiple collectors 1208. Sensors 1204 can be assigned to send reports to a primary collector and a secondary collector. In some embodiments, sensors 1204 are not assigned a collector, but determine an optimal collector through a discovery process. Sensors 1204 can change where they send their reports if its environment changes. For example, if a certain collector experiences failure or if the sensor 1204 is migrated to a new location and is closer to a different collector. In some embodiments, sensors 1204 send different reports to different collectors. For example, sensors 1204 can send reports related to one type of process to one collector and reports related to another type of process to another collector.

Collectors 1208 can serve as a repository for the data recorded by the sensors. In some embodiments, collectors 1208 are directly connected to the top of rack switch; alternatively, collectors 1208 can be located near the end of row or elsewhere on or off premises. The placement of collectors 1208 can be optimized according to various priorities such as network capacity, cost, and system responsiveness. In some embodiments, collectors' 1208 data storage is located in an in-memory database such as dashDB by IBM. This approach benefits from rapid random access speeds that typically are required for analytics software. Alternatively, collectors 1208 can utilize solid state drives, disk drives, magnetic tape drives, or a combination of the foregoing according to cost, responsiveness, and size requirements. Collectors 1208 can utilize various database structures such as a normalized relational database or NoSQL database.

In some embodiments, collectors 1208 only serve as network storage for the traffic monitoring system 1200. Alternatively, collectors 1208 can organize, summarize, and preprocess data. For example, collectors 1208 can tabulate how often packets of certain sizes or types are transmitted from different virtual machines. Collectors 1208 can also characterize the traffic flows going to and from various network components. In some embodiments, collectors 1208 can match packets based on sequence numbers, thus identifying traffic flows and connection links. In some embodiments, collectors 1208 flag anomalous data. Because it would be inefficient to retain all data indefinitely, collectors 1208 can routinely replace detailed reports with consolidated summaries. In this manner, collectors 1208 can retain a complete dataset describing one period (e.g., the past minute), with a smaller report of another period (e.g., the previous), and progressively consolidated reports of other times (day, week, month, year, etc.). By organizing, summarizing, and preprocessing the data, collectors 1208 can help traffic monitoring system 1200 scale efficiently. Although collectors 1208 are generally herein referred to as a plural noun, a single machine or cluster of machines are contemplated to be sufficient, especially for smaller datacenters. In some embodiments, collectors 1208 serve as sensors 1204 as well.

In some embodiments, collectors 1208 receive data that does not come from sensors 1204. For example, they can receive data external to traffic monitoring system 1200 such as security reports, white-lists, IP watchlists, whois data, power status, temperature readings, etc.

Configuration and image manager 1202 can configure and manage sensors 1204. When a new virtual machine is instantiated or when an existing one is migrated, configuration and image manager 1202 can provision and configure a new sensor on the machine. In some embodiments configuration and image manager 1202 can monitor the health of sensors 1204. For example, configuration and image manager 1202 might request status updates or initiate tests. In some embodiments, configuration and image manager 1202 also manages and provisions virtual machines.

In some embodiments, configuration and image manager 1202 can verify and validate sensors 1204. For example, sensors 1204 can be provisioned a unique ID that is created using a one-way hash function of its BIOS UUID and a secret key stored on configuration and image manager 1202. This unique ID can be a large number that is difficult for an imposter sensor to guess. In some embodiments, configuration and image manager 1202 can keep sensors 1204 up to date by installing new versions of their software and applying patches. It can get these updates from a local source or automatically from the Internet.

Analytics module 1220 can have a wide bandwidth connection to the various collectors 1208 and can process the data stored therein. Analytics module 1220 can accomplish various tasks in its analysis, some of which are herein disclosed. In some embodiments, traffic monitoring system 1200 can automatically determine network topology. Using data provided from sensors 1204, traffic monitoring system 1200 can determine what type of devices exist on the network (brand and model of switches, gateways, machines, etc.), where they are physically located (e.g., latitude and longitude, building, datacenter, room, row, rack, machine, etc.), how they are interconnected (120 Gb Ethernet, fiber-optic, etc.), and what the strength of each connection is (bandwidth, latency, etc.). Automatically determining the network topology can assist with integration of traffic monitoring system 1200 within an already established datacenter. Furthermore, analytics module 1220 can detect changes of network topology without the needed of further configuration.

Analytics module 1220 can determine dependencies of components within the network. For example, if component A routinely sends data to component B but component B never sends data to component A, then analytics module 1220 can determine that component B is dependent on component A, but A is likely not dependent on component B. If, however, component B also sends data to component A, then they are likely interdependent. These components can be processes, virtual machines, hypervisors, VLANs, etc. Once analytics module 1220 has determined component dependencies, it can then form a component ("application") dependency map. This map can be instructive when analytics module 1220 attempts to determine the root cause of a failure (because failure of one component can cascade and cause failure of its dependent components) or when analytics module 1220 attempts to predict what will happen if a component is taken offline. Additionally, analytics module 1220 can associate edges of an application dependency map with expected latency, bandwidth, etc. for that individual edge.

Analytics module 1220 can establish patterns and norms for component behavior. For example, it can determine that certain processes (when functioning normally) will only send a certain amount of traffic to a certain VM using a small set of ports. Analytics module can establish these norms by analyzing individual components or by analyzing data coming from similar components (e.g., VMs with similar configurations). Similarly, analytics module 1220 can determine expectations for network operations. For example, it can determine the expected latency between two components, the expected throughput of a component, response times of a component, typical packet sizes, traffic flow signatures, etc. In some embodiments, analytics module 1220 can combine its dependency map with pattern analysis to create reaction expectations. For example, if traffic increases with one component, other components may predictably increase traffic in response (or latency, compute time, etc.).

In some embodiments, analytics module 1220 uses machine learning techniques to identify which patterns are desirable or unwanted. For example, a network administrator can indicate network states corresponding to an attack and network states corresponding to normal operation. Analytics module 1220 can then analyze the data to determine which patterns most correlate with the network being in a desirable or undesirable state. In some embodiments, the network can operate within a trusted environment for a time so that analytics module 1220 can establish baseline normalcy. In some embodiments, analytics module 1220 contains a database of norms and expectations for various components. This database can incorporate data from sources external to the network. Analytics module 1220 can then create access policies for how components can interact. In some embodiments, policies can be established external to traffic monitoring system 1200 and analytics module 1220 can detect the policies and incorporate them into this framework. A network administrator can manually tweak the policies. Policies can dynamically change and be conditional on events. These policies can be enforced on the components. Policy engine 1222 can maintain these policies and receive user input to change the policies.

Policy engine 1222 can configure analytics module 1220 to establish what network policies exist or should be maintained. For example, policy engine 1222 may specify that certain machines should not intercommunicate or that certain ports are restricted. Network and security policy controller 1224 can set the parameters of policy engine 1222. In some embodiments, policy engine 1222 is accessible via the presentation module.

Over time, components may occasionally exhibit anomalous behavior. Analytics module 1220 can analyze the frequency and severity of the anomalous behavior to determine a reputation score for the component. Analytics module 1220 can use the reputation score of a component to selectively enforce policies. For example, if a component has a high reputation score, analytics module 1220 may allow the component to periodically violate its relevant policy; while if the component frequently violates its relevant policy, its reputation score may be lowered. Analytics module 1220 can correlate observed reputation score with characteristics of a component. For example, a particular virtual machine with a particular configuration may be more prone to misconfiguration and receive a lower reputation score. In some embodiments, policies are strictly followed, but explicitly factor in a component's reputation score. When a new component is placed in the network, analytics module 1220 can assign a starting reputation score similar to the scores of similarly configured components. The expected reputation score for a given component configuration can be externally sourced outside of the datacenter. A network administrator can be presented with expected reputation scores for various components before installation, thus assisting the network administrator in choosing components and configurations that will result in high reputation scores.

Some anomalous behavior can be indicative of a misconfigured component or a malicious attack. Certain attacks are easy to detect if they originate outside of the datacenter, but can prove difficult to detect and isolate if they originate from within the datacenter. One such attack could be a distributed denial of service (DDOS) where a component or group of components attempt to overwhelm another component with spurious transmissions and requests. Detecting an attack or other anomalous network traffic can be accomplished by comparing the expected network conditions with actual network conditions. For example, if a traffic flow varies from its historical signature (packet size, TCP header options, etc.) it may be an attack.

Once undesirable traffic is identified, analytics module 1220 can enforce and modify policies in order to mitigate the effects of the traffic. For example, a virtual machine may be prevented from communicating on certain ports. Analytics module 1220 can use the sensors 1204 to enforce these policies, including restarting a component. For example, if analytics module 1220 determines that an individual process is causing the attack, it can direct the sensor located on that virtual machine to terminate or restart the process. This enables other processes on the virtual machine and other network components to continue normal operation without interruption.

In some embodiments, analytics module 1220 can simulate changes in the network. For example, analytics module 1220 can simulate what may result if a machine is taken offline, if a connection is severed, or if a new policy is implemented. This type of simulation can provide a network administrator with greater information on what policies to implement. In some embodiments, the simulation may serve as a feedback loop for policies. For example, there can be a policy that if certain policies would affect certain services (as predicted by the simulation) those policies should not be implemented. Analytics module 1220 can use simulations to discover vulnerabilities in the datacenter. In some embodiments, analytics module 1220 can determine which services and components will be affected by a change in policy. Analytics module 1220 can then take necessary actions to prepare those services and components for the change. For example, it can send a notification to administrators of those services and components, it can initiate a migration of the components, it can shut the components down, etc.

In some embodiments, analytics module 1220 can supplement its analysis by initiating synthetic traffic flows and synthetic attacks on the datacenter. These artificial actions can assist analytics module 1220 in gathering data to enhance its model. In some embodiments, these synthetic flows and synthetic attacks are used to verify the integrity of sensors 1204, collectors 1208, and analytics module 1220.

In some cases, a traffic flow is expected to be reported by a sensor, but that sensor fails to report it. This situation could be an indication that the sensor has failed or become compromised. By comparing the reports from multiple sensors 1204 spread throughout the datacenter, analytics module 1220 can determine if a certain sensor is failing to report a particular traffic flow.

Presentation module 1226 can comprise serving layer 1228, authentication module 1220, web front end 1222, and public alert module 1224 connected to third party tools 1226. As analytics module 1220 processes the data and generates reports, they may not be in a human-readable form or they may be too large for an administrator to navigate. Presentation module 1226 can take the reports generated by analytics module 1220 and further summarize, filter, and organize the reports as well as create intuitive presentations of the reports.

Serving layer 1228 can be the interface between presentation module 1226 and analytics module 1220. As analytics module 1220 generates reports, predictions, and conclusions, serving layer 1228 can summarize, filter, and organize the information that comes from analytics module 1220. In some embodiments, serving layer 1228 can request raw data from a sensor, collector, or analytics module 1220.

Web frontend 1222 can connect with serving layer 1228 to present the data from serving layer 1228 in a page for human presentation. For example, web frontend 1222 can present the data in bar charts, core charts, tree maps, acyclic dependency maps, line graphs, tables, etc. Web frontend 1222 can be configured to allow a user to "drill down" on information sets to get a filtered data representation specific to the item the user wishes to "drill down" to. For example, individual traffic flows, components, etc. Web frontend 1222 can also be configured to allow a user to filter by search. This search filter can use natural language processing to determine analyze the network administrator's input. There can be options to view data relative to the current second, minute, hour, day, etc. Web frontend 1222 can allow a network administrator to view traffic flows, application dependency maps, network topology, etc.

In some embodiments, web frontend 1222 is solely configured to present information. In some embodiments, web frontend 1222 can receive inputs from a network administrator to configure traffic monitoring system 1200 or components of the datacenter. These instructions can be passed through serving layer 1228, sent to configuration and image manager 1202, or sent to policy engine 1222. Authentication module 1220 can verify the identity and privileges of the network administrator. In some embodiments, authentication module 1220 can grant network administrators different rights according to established policies.

Public alert module 1224 can identify network conditions that satisfy specified criteria and push alerts to third party tools 1226. Public alert module 1224 can use reports generated or accessible through analytics module 1220. One example of third party tools 1226 is a security information and event management system. Third party tools 1226 may retrieve information from serving layer 1228 through an API.

The various elements of network monitoring system 1200 can exist in various configurations. For example, collectors 1208 can be a component of sensors 1204. In some embodiments, elements perform some calculating and summarizing to ease the task of analytics module 1220.

Figure 13:
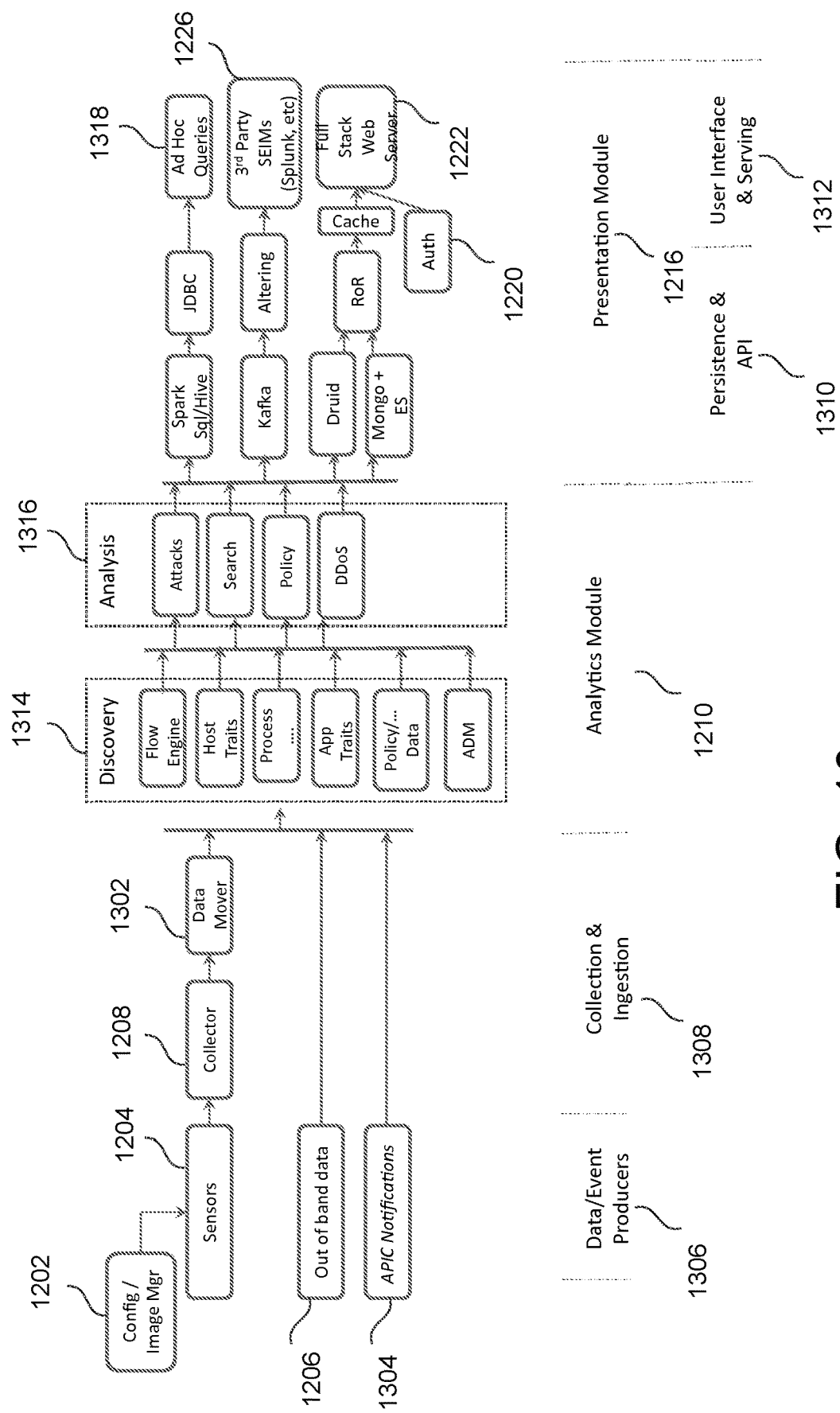
FIG. 13 depicts a data processing architecture of a network monitoring system.

FIG. 13 depicts the data processing architecture of network monitoring system 1200 in greater detail. Data originates with data/event producers 1306. These producers 1306 include sensors 1204, out of band data 1206, and APIC notifications 1304. Out of band data 106 includes data that comes from external sources (e.g., whitelists, IP watchlists, whois data, etc.). APIC notifications, or Application Policy Infrastructure Controller provides an application-level policy engine for physical, virtual, and cloud infrastructures. Data from sensors 1204 passes to a collection and ingestion stage 1308 where collectors 1208 and data mover 1302 compile data and move it around the data center. Out of band data 1206 and APIC notifications 1304 can pass directly to analytics module 1210.

Data then passes to the analytics module 1210 which comprises discovery engines 1314 and analytics engines 1316. Discovery engines 1314 can comprise a flow engine that uses packet data to identify traffic flows. Discovery engines 1314 can also comprise engines to identify host traits, process characteristics, application traits, policy and data traits. Further, discovery engines 1314 can comprise an application dependency mapping (ADM) engine as well as an engine to determine network topology (not depicted). These engines can discover the condition of network elements.

Analysis engines 1316 ingest the conditions and traits determined by discovery engines 1314 to identify network states and cross correlations. For example, analysis engines 1316 can comprise an attack detection engine, a search engine, a policy engine, and a DDOS detection engine.

The depicted engines can work independently or in concert. Analysis engines 1316 can ingest data from multiple discovery engines 1314. Discovery engines 1314 may perform analysis functions and analysis engines 1316 may perform discovery functions. Analytics module 1210 can comprise engines that are neither discovery engines 1314 nor analysis engines 1316.

Data can then flow from analytics module 1210 to presentation module 1216 which can comprise a persistence and API segment 1310 and a user interface and serving segment 1312. Persistence and API segment 1310 can comprise various database programs and access protocols. For example, Spark, sql, Hive, Kafka, Druid, Mongo, Java Database Connectivity (JDBC), and Ruby on Rails. User interface and serving segment 1312 can comprise various interfaces, for example, ad hoc queries 1318, third party SEIMs 1226, and full stack web server 1222.

A hypervisor may host multiple VMs which can communicate with each other and the Internet. The hypervisor will also include virtual switching devices. The virtual switching devices send and transmit the data between VMs and the Internet. When handling or forwarding packets, the virtual switching devices typically use different forwarding models depending on the type of virtual switching device, such as Linux bridge, Open vSwitch, vNic, or other software switch. It is important to understand what type of switching device and forwarding model is used by a hypervisor in order to optimize connections and properly attach VMs to the virtual switching device.

A Tetration policy pipeline is composed of four steps/modules:

(1) Application Dependency Mapping

In this stage, network traffic is analyzed to determine a respective graph for each application operating in a data center (discussed in detail elsewhere). That is, particular patterns of traffic will correspond to an application, and the interconnectivity or dependencies of the application are mapped to generate a graph for the application. In this context, an "application" refers to a set of networking components that provides connectivity for a given set of workloads. For example, in a conventional three-tier architecture for application, the servers and other components of the web tier, application tier, and data tier would make up an application.

(2) Policy Generation

Whitelist rules are then derived for each application graph determined in (1) (discussed in detail elsewhere). As is known in the art, in a blacklist model, all communication is open unless explicitly denied, whereas a whitelist model requires communication to be explicitly defined before being permitted. Conventional systems use a blacklist model. One of the advantages of the Tetration system is implementation of a whitelist model, which may be more secure than a blacklist model. For instance, using a whitelist model is recognized by the Australian Signal Directorate to be the #1 approach for mitigating targeted cyber attacks (http://www.asd.gov.au/infosec/top-mitigations/top-4-strategies-explained.htm).

As an example of whitelist rule generation, suppose there is an edge of an application graph between El (e.g., endpoint, endpoint group) and E2. Permissible traffic flows on a set of ports of El to one or more ports of E2. A policy can be defined to reflect the permissible traffic from the set of ports of El to the one or more ports of E2.

(3) Flow Pre-Processing

After the application dependencies are mapped and the policies are defined, network traffic is pre-processed in the policy pipeline for further analysis. For each flow, the source endpoint of the flow is mapped to a source endpoint group (EPG) and the destination endpoint of the flow is mapped to a destination EPG. Each flow can also be "normalized" by determining which EPG corresponds to the client, and which EPG corresponds to the server.

(4) Flow Analysis

Each pre-processed flow is then analyzed to determine which policies are being enforced and the extent (e.g., number of packets, number of flows, number of bytes, etc.) those policies are being enforced within the data center.

This flow analysis occurs continuously, and the Tetration system allows a user to specify a window of time (e.g., time of day, day of week or month, month(s) in a year, etc.) to determine which policies are being implemented (or not being implemented) and how often those policies are being implemented.

The invention claimed is:

1. A system comprising:
   a first network device comprising one or more processors and at least one non-transitory computer readable medium having stored thereon instructions which, when executed by the one or more processors, cause the one or more processors to send or receive one or more packets at a device interface, the one or more packets being associated with a first network flow from a plurality of network flows, the first network device further including at least a first network-addressable operating environment, the first network-addressable operating environment including at least one container, each container hosting a compute workload;
   a capturing agent interposed between the device interface and the first network-addressable operating environment configured to receive the first network flow;
   a network traffic engine, the network traffic engine including a collector, wherein the capturing agent is configured to send information from the first network flow to the collector, and the collector is configured to receive the information from the first network flow from the capturing agent, the network traffic engine further including a flow analysis module and a policy engine associated with the collector; and
   a data mover associated with the network traffic engine, wherein the data mover is operable to route one or more network flows to their destinations;
   the system further including at least a first network policy affecting one or more operating environments and one or more network flows, wherein the first network-addressable operating environment is included within the one or more affected operating environments, and the first network flow is included within the one or more affected network flows;
   wherein the first network flow is routed by the data mover in compliance with the first network policy, as directed by the network traffic engine.

2. The system of claim 1, wherein the information from the first network flow includes packets from the first network flow.

3. The system of claim 1, wherein the information from the first network flow includes first flow metadata describing the first network flow.

4. The system of claim 1, wherein the network policy includes a set of whitelist rules defining allowed network flows between specifically identified operating environments.

5. The system of claim 4, wherein the graphical user interface further includes a visual representation of the logical connections within the network.

6. The system of claim 1, wherein the network engine associates first flow metadata with the first network flow and provides the first flow metadata to at least one of the flow analysis module and the policy engine.

7. The system of claim 1, wherein the system further includes a presentation module providing a graphical user interface to at least one of the analysis module and the policy engine.

8. The system of claim 1, wherein the system further includes a security monitoring module operable to identify an unauthorized network flow from the first network-addressable operating environment.

9. A method comprising the steps of:
receiving, at a collector, information from a first network flow of a plurality of network flows, the first network flow being received from a capturing agent interposed between a device interface associated with a first network device and a first network-addressable operating environment included in the first network device and configured to receive the first network flow, the first network-addressable operating environment including at least one container hosting a workload operating on the first network flow;
applying, at a policy engine associated with the collector, at least a first network policy affecting one or more network-addressable operating environments and one or more network flows, wherein the first network-addressable operating environment is included within the one or more affected network-addressable operating environments and the first network flow is included within the one or more affected network flows; and
routing, by a data moving facility operable to route one or more network flows to their destinations, the first network flow in compliance with the first network policy.

10. The method of claim 9, wherein the information from the first network flow includes packets from the first network flow.

11. The method of claim 9, wherein the information from the first network flow includes first flow metadata describing the first network flow.

12. The method of claim 9, wherein the at least one container is a source or destination for at least one of the plurality of network flows.

13. The method of claim 9, wherein the workload operating on the first network flow includes processing values included in the first network flow.

14. The method of claim 9, wherein the workload operating on the first network flow includes generating values included in the first network flow.

15. The method of claim 9, wherein the network device is operable to send or receive one or more packets associated with a first network flow via the device interface.

16. The method of claim 9, further comprising the steps of:
associating first flow metadata with the first network flow; and
providing the first flow metadata to at least one of a flow analysis module associated with the collector and the policy engine.

17. The method of claim 9, wherein the first network policy includes a set of whitelist rules defining allowed network flows between specifically identified operating environments.

18. The method of claim 17, wherein one of the capturing agent and the collector comprises a process running on the network device.

19. The method of claim 9, wherein the capturing agent is provisioned by a virtual switching device and configured to route the first network flow to the collector.

20. A method comprising:
receiving one or more packets at an interface at a first device in a network environment, the one or more packets being associated with a first network flow, wherein the first device includes a plurality of virtual partitions, wherein the plurality of virtual partitions comprises either virtual machines (VMs), containers, or both, wherein the first device further includes a capturing agent receiving the flow prior to the flow being routed to or from an endpoint associated with a first operating environment from a plurality of operating environments, the capturing agent extracting one or more values from the flow, the values representing different policy parameters;
sending the policy parameters to a policy evaluation agent;
determining, via the policy evaluation agent, one or more policies that are applicable to the endpoint based on the policy parameters extracted from the flow; and
enforcing the one or more policies with respect to the endpoint.

21. The method of claim 20, wherein the policy whitelists certain connections and denies others.

22. The method of claim 20, further including showing flow-related information to a user via a graphical user interface.

23. The method of claim 20, further including showing policy-related information to a user via a graphical user interface.

24. The method of claim 20, wherein at least one of the capturing agent and the collector is implemented as a process on the first device.

* * * * *